US007047642B2

(12) United States Patent
Kataoka et al.

(10) Patent No.: US 7,047,642 B2

(45) Date of Patent: May 23, 2006

(54) PROCESS FOR PRODUCING INK JET RECORDING HEAD

(75) Inventors: Masaki Kataoka, Ebina (JP); Michiaki Murata, Ebina (JP); Kenji Yamazaki, Ebina (JP); Yoshihisa Ueda, Ebina (JP); Norikuni Funatsu, Ebina (JP); Kumiko Tanaka, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 457 days.

(21) Appl. No.: 10/115,439

(22) Filed: Apr. 4, 2002

(65) Prior Publication Data

US 2002/0145647 A1 Oct. 10, 2002

(30) Foreign Application Priority Data

Apr. 5, 2001 (JP) ............................ 2001-107283

(51) Int. Cl.
*B21D 53/76* (2006.01)
*B23P 17/00* (2006.01)

(52) U.S. Cl. ......................... 29/890.1; 29/415; 29/417; 29/890.09; 216/27; 347/24

(58) Field of Classification Search .................. 29/412, 29/415, 417, 418, 890.1, 611, 890.09; 216/27, 216/52, 41, 49, 67, 79, 88; 347/224, 65, 347/20

See application file for complete search history.

(56) References Cited

U.S. PATENT DOCUMENTS

| | | | | |
|---|---|---|---|---|
| 5,057,853 | A * | 10/1991 | Fisher | 347/63 |
| 5,124,717 | A * | 6/1992 | Campanelli et al. | 216/27 |
| 5,141,596 | A * | 8/1992 | Hawkins et al. | 216/27 |
| 5,204,690 | A * | 4/1993 | Lorenze et al. | 216/27 |
| 5,680,702 | A * | 10/1997 | Kataoka | 29/890.1 |

FOREIGN PATENT DOCUMENTS

| | | | |
|---|---|---|---|
| JP | 5-193134 | A | 8/1993 |
| JP | 5-208503 | A | 8/1993 |
| JP | 6-134996 | A | 5/1994 |
| JP | 7-137266 | A | 5/1994 |
| JP | 6-183002 | A | 7/1994 |
| JP | 9-226142 | A | 9/1997 |
| JP | 9-327921 | A | 12/1997 |
| JP | 10-76650 | A | 3/1998 |
| JP | 11-227208 | A | 8/1998 |
| JP | 2888474 | B2 | 2/1999 |
| JP | 2000-94700 | A | 4/2000 |
| JP | 2001-129799 | A | 5/2001 |
| JP | 2001-169090 | A | 6/2001 |
| JP | 2001-246758 | A | 9/2001 |
| JP | 2001-138541 | A | 5/2002 |

* cited by examiner

*Primary Examiner*—Minh Trinh
*Assistant Examiner*—Donghai D. Nguyen
(74) *Attorney, Agent, or Firm*—Morgan Lewis & Bockius LLP

(57) ABSTRACT

An ink jet recording head and a process for producing the same, and an ink jet recording apparatus are provided that improve the printing performance and also improve the production efficiency. A conjugated body 73 formed by conjugating silicon wafers 50 and 58 is cut, whereby nozzles 22 are opened, and cutting into head chip units is carried out. At this time, deep grooves 84 are formed on the surface of the silicon wafer 58 by anisotropic etching, and they are penetrated by etching on the opposite side. Grooves 90 are formed on the silicon wafer 50 by using the thus penetrated deep grooves 84 as a mask.

13 Claims, 23 Drawing Sheets

32
32
SIGNAL PROCESSING CIRCUIT
DRIVER CIRCUIT
54
52
64
60
62
50
58

68
56
58
70
66

72

50
58
56

70
72
50
58
73
74
74

12
30A
32
16
18
14
22

227
SIGNAL PROCESSING CIRCUIT
222
DRIVER CIRCUIT
224
208
228
233
232

230
228
233
235

228
232
232

234
234
228
232
237

200
210
220
226
204

PROCESS FOR PRODUCING INK JET RECORDING HEAD

BACKGROUND OF THE INVENTION

1. Field of the Invention

The present invention relates to an ink jet recording head ejecting ink droplets to a recording material to form an image, an ink jet recording apparatus and a process for producing the head.

2. Description of the Related Art

In recent years, an ink jet recording apparatus is receiving attention as a color recording apparatus of high quality in spite of the low cost thereof. As an ink jet recording head for an ink jet recording apparatus, for example, a piezoelectric ink jet recording head ejecting an ink from a nozzle by pressure generated by mechanical deformation of a presser chamber with a piezoelectric material, and a thermal ink jet recording head ejecting an ink from a nozzle by pressure generated by evaporation of the ink caused by electrification applied to heater elements arranged on respective flow paths have been known.

As a currently available thermal ink jet recording head, ink jet recording heads disclosed in JP-A-9-226142 (hereinafter referred to as Conventional Example 1), JP-A-10-76650 (hereinafter referred to as Conventional Example 2), and JP-A-9-327921 (hereinafter referred to as Conventional Example 3) have been known.

The ink jet recording head of Conventional Example 1 will be described below with reference to FIGS. 23 to 26B. FIG. 23 is a perspective view showing an example of an ink jet recording head and an ink supplying member carried on a conventional ink jet recording apparatus. FIG. 24 is a cross sectional view on line B— B in FIG. 23.

As shown in FIGS. 23 and 24, a head chip 200 has plural respective flow paths 202 formed therein, and nozzles 204 for ejecting an ink are formed on the tip ends thereof. The plural respective flow paths 202 are connected to a common liquid chamber 206 inside the head chip. Heater elements 208 are provided on the mid flows of the respective flow paths 202, an ink in the respective flow paths 202 in contact with the heater elements 208 is bubbled with heat from the heater elements 208, whereby ink droplets are ejected from the nozzles 204 by pressure obtained by the bubbling to carry out recordation. The common liquid chamber 206 has an ink supplying inlet 210 for supplying the ink from the outside.

An ink supplying member 212 is arranged on an upper part of the heat chip 200. The ink supplying member 212 has an ink flow path 214 for supplying the ink from an ink tank (not shown in the figure) to the head chip 200. On the mid flow of the ink tank and the ink supplying member 212 (ink flow path 214), a filter (not shown in the figure) is arranged to filter minute solid matters in the ink to prevent invasion of minute solid matter into the head chip 200, whereby clogging of the nozzles is prevented.

The head chip 200 is formed by conjugating a flow path substrate 220 having the respective flow paths 202, the common liquid chamber 206 and the like formed therein and a heater element substrate 226 having the heater elements 208 formed therein.

A process for producing the head chip 200 configured as in the foregoing will be described with reference to FIGS. 25A to 25F.

The heater element substrate 226 can be produced, for example, by using the production technique and the production apparatus for an LSI. On a single crystal silicon wafer 228, a heater layer forming the heater elements, and a protective layer for preventing the heater elements 208 from breakage by pressure of the bubbles thus formed are formed (as shown in FIG. 25A). A signal line for supplying electric power and signals to the heater layer from the outside is connected thereto. Driver circuits 224, signal processing circuits 222 and external signal input and output terminals 227 are similarly formed for the plural heads. A resin layer 230 formed, for example, with photosensitive polyimide, is accumulated as a protective layer to an ink (as shown in FIG. 25B).

The flow path substrate 220 can be produced by forming, on a silicon wafer 232, grooves 233 and 235 forming the common liquid chambers 206 and the respective flow paths 202 by orientation dependent etching (as shown in FIGS. 25C and 25D). As the method for forming the grooves 233 and 235 by orientation dependent etching, as shown in JP-A-6-183002, an etching mask is patterned on a silicon wafer having a <100> crystalline plane as a surface, and etching is carried out by using a heated potassium hydroxide (KOH) aqueous solution. The grooves 233 and 235 to be the common chambers 206 and the respective flow paths 202 formed by using the orientation dependent etching become grooves having desired angles.

After coating an adhesive to the silicon wafer 232, the two silicon wafers 228 and 232 are conjugated with accurate positioning with positioning marks 234 (as shown in FIG. 25E). Thereafter, the silicon wafers thus conjugated are cut and separated into a dice form along dicing lines 237, for example, by a method disclosed in Japanese Patent No. 2,888,474, to produce plural head chips 200 at the same time (as shown in FIG. 25F). The tip ends of the flow paths 202 are opened by cutting to form the nozzles 204 ejecting ink droplets.

Thereafter, the head chip 200 is fixed on a heat sink 236 for heat dissipation as shown in FIGS. 23 and 24. The heat sink 236 also has a printed circuit substrate 238 formed thereon, whereby electric power and signals supplied to a main body of the ink jet recording apparatus are transmitted to the heater element substrate 226, and at the same time, signals of various sensors provided on the heater element substrate 226 are transmitted to the main body of the ink jet recording apparatus.

An ink is supplied from an ink tank to an ink jet recording head 244 thus produced. The ink supplied from the ink tank runs in the ink flow path 214 inside the ink supplying member 212 to reach the common liquid chamber 206 inside the head chip 200 through the ink supplying inlet 210 opened on an upper part of the flow path substrate 220 of the head chip 200, and then supplied to the respective flow paths 202, whereby ink droplets are ejected from the nozzles 204 with the heater elements 208.

In recent years, however, an ink jet recording apparatus is demanded to have high resolution and small dots for attaining high image quality, and the dimensions of the respective flow paths 202 and the nozzle 204 of the head chip 200 are considerably decreased associated with the demands. The thus narrowed respective flow paths 202 are easily clogged with a small foreign matter that has not caused any problem to cause a critical printing defect, i.e., dot missing. In order to attain such high resolution at a printing speed that is equivalent to or higher than the conventional products, the number of nozzles per chip head is necessarily increased, and the increase of the nozzles also lowers the reliability of the ink jet recording head. In other words, the unitary reliability of the nozzle is necessarily increased by a large margin in order to maintain and improve the reliability of the ink jet recording head.

Under the circumstances, JP-A-2001-246758 proposes a measure for preventing the clogging by providing fine filters in the vicinity of inlets of the respective flow paths in addition to the filter provided on the mid flow of the ink tank and the ink supplying member 212. The filters adjacent to the respective flow paths exert a considerable effect for preventing the clogging. However, when a large amount of foreign matters are trapped at the filter, the supply of the ink to the corresponding respective flow path 202 is impaired because the filter is positioned adjacent to the respective flow path, whereby such a problem is caused that the ink discharging (printing) performance is lowered. Thus, there is room for improvement in the case of an ink jet recording head that is used for a long period of time.

FIGS. 26A and 26B show the improved head chip proposed in JP-A-2001-246758, in which FIG. 26A is a plane view showing the flow path part of the head chip, and FIG. 26B is a cross sectional view thereof. That is, a filter 250 is formed in such a manner that columnar bodies are formed at positions with a prescribed interval inside the common liquid chamber 206 with a certain distance from the respective flow paths 202 rather than at the inlets of the respective flow paths 202. In this case, even when the filter 250 catches a foreign matter, an ink is supplied to a respective flow path 202A through a space between the filter 250 and the respective flow paths 202, and thus the ink is discharged from a nozzle 204A (as shown by the arrows in FIG. 26A). However, when a large amount of foreign matters 252 are caught in the direction aligning the respective flow paths 202, the supply speed of the ink cannot follow the printing speed to cause defects, such as thin spots upon continuous printing.

Furthermore, the discharging direction of ink droplets is largely affected by defects, such as cracking of the nozzle part, that are allowed in the conventional products, and thus there is an increased demand for the quality of the nozzles.

Moreover, the depth of the common liquid chamber of the conventional inkjet recording head is determined by the thickness of the silicon wafer and is about from 500 to 600 μm. On the other hand, because the groove depth of the miniaturized respective flow paths is about 10 μm, the ink flow rate is considerably slowed down in the common liquid chamber, and there are such regions where the ink is substantially not moved (dead water regions) in some locations. Therefore, when a gas dissolved in the ink forms bubbles due to temperature change, the bubbles stay in the regions with no flow and grow therein. At this time, the growing bubbles in the ink jet recording head 200 are large due to the large capacity of the common liquid chamber 206. Therefore, they cause serious printing defects due to inhibition of supply of an ink to the respective flow paths 202, and the aspiration amount of the ink upon removing the bubbles by aspirating the ink from the nozzles 204 is increased, whereby they cause not only deterioration in ink using efficiency but also deterioration in total printing speed.

SUMMARY OF THE INVENTION

In order to solve the problems, the present invention provides an ink jet recording head, an ink jet recording apparatus and a process for producing an ink jet recording head, by which printing performance of an ink jet recording head is improved.

The invention relates to, as one aspect, a process for producing an ink jet recording head containing steps of: conjugating a first silicon wafer having grooves for flow paths on a flow path forming surface thereof and a second silicon wafer having ink ejecting elements on an ejecting element forming surface thereof with the ejecting element forming surface and the flow path forming surface being faced each other to form a conjugated body; and cutting the conjugated body by a non-contact cutting method to open ink discharging outlets on a cut surface.

According to the aspect, after conjugating the first silicon wafer having grooves for flow paths formed thereon and the second silicon wafer having ink ejecting elements formed thereon, they are cut to open ink discharging outlets (nozzles) on a end surface. At this time, because cutting of the conjugated body is carried out by a non-contact method, parts of the silicon wafer constituting the circumference of the ink discharging outlets are prevented from cracking. Therefore, the discharging direction of ink droplets of the ink jet recording head thus produced is stabilized to improve the ink discharging performance (printing performance).

The conjugated body may be cut after thinning a thickness of the conjugated body from at least one surface of the conjugated body.

In this case, because the conjugated body is cut after thinning the conjugated body, the load associated with the cutting operation is reduced. Furthermore, because the conjugated body is thinned, the ink jet recording head thus produced is miniaturized.

The invention also relates to, as another aspect, a process for producing an ink jet recording head containing step of: forming, on a first silicon wafer having grooves for flow paths on a flow path forming surface, deep grooves having a depth lager than that of the ink discharging flow path grooves by a non-contact cutting method; conjugating a second silicon wafer having ink ejecting elements on an ejecting element forming surface and the first silicon wafer with the ejecting element forming surface and the flow path forming surface being faced each other to form a conjugated body, thinning the first silicon wafer constituting the conjugated body from a back surface of the flow path forming surface to penetrate only the deep grooves to the back surface; and cutting the conjugated body having the deep grooves thus penetrated into respective head chips to complete the ink jet recording head.

According to the aspect, deep grooves having a depth larger than that of the ink discharging flow path grooves are continuously formed on the flow path forming surface of the first silicon wafer by a non-contact cutting method. As a result, tip ends of the ink discharging flow path grooves opening on the deep groove part after forming the conjugated body become the ink discharging outlets (nozzles). Therefore, the nozzle end surface around the openings of the ink discharging outlets in the first silicon wafer is formed by the non-contact cutting method, and cracking on that part can be suppressed from forming. As a result, the reliability of the discharging direction of ink droplets discharged from the respective ink discharging outlets of the ink jet recording head thus produced can be improved to attain improvement in printing performance.

After penetrating the deep grooves, deep grooves may be formed on the ejecting element forming surface of the second silicon wafer through the deep grooves thus penetrated by a non-contact cutting method.

In this case, the deep grooves are formed on the ejecting element forming surface of the second silicon wafer through the deep grooves thus penetrated in the first silicon wafer by a non-contact cutting method. Therefore, in the case of etching, for example, deep grooves are formed on the ejecting element forming surface of the second silicon wafer through the deep grooves thus penetrated by using the first silicon wafer as a mask. Therefore, the end surfaces of the first silicon wafer and the second silicon wafer forming the nozzle end surface around the ink discharging outlets agree with each other. Because the deep grooves on the second silicon wafer are also formed by a non-contact cutting method, cracking of the second silicon wafer in the vicinity of the ink discharging outlets can also be prevented. The discharging direction of ink droplets discharged from the ink jet recording head thus produced is stabilized to improve the printing performance.

Alternatively, after forming the deep grooves on the ejecting element forming surface, the deep grooves may be penetrated to the back surface of the second silicon wafer to cut the conjugated body into respective head chips.

In this case, because the deep grooves on the ejecting element forming surface of the second silicon wafer are penetrated to the back surface of the ejecting element forming surface of the second silicon wafer, the conjugated body can be cut into respective head chips by using the deep grooves for forming the nozzle end surface. Therefore, the production efficiency is improved.

Furthermore, the deep grooves on the second silicon wafer may be penetrated by thinning the second silicon wafer from the back surface.

Because the deep grooves are penetrated by thinning the second silicon wafer from the back surface, the ink jet recording head itself can be further miniaturized.

Furthermore, the deep grooves formed on the first silicon wafer may have a depth that is larger than those of all the other grooves for flow paths.

In the case where the first silicon wafer is thinned from the back surface of the first silicon wafer, only the grooves formed thereon can be penetrated when the grooves are deeper than all the other grooves for flow paths.

Furthermore, ink supplying inlets may be opened simultaneously with penetration of the deep grooves formed on the first silicon wafer.

The penetration of the deep grooves on the first silicon wafer and opening of the ink inlet are carried out by the same process step, and thus the production efficiency of the ink jet recording head is improved.

Furthermore, the non-contact cutting method may have vertical anisotropy.

In this case, the deep grooves can be formed with high accuracy in a perpendicular direction to the silicon wafer owing to the vertical anisotropy of the non-contact cutting method. Therefore, the nozzle end surface constituted with side surfaces of the deep grooves can be formed with high accuracy.

Furthermore, in the case where the non-contact cutting method is etching, a resist pattern may be formed to have openings only on a region where the deep grooves are to be formed on the flow path forming surface of the first silicon wafer having grooves for flow paths, and the deep grooves may be formed by etching by using the resist as a mask.

In this case, if the non-contact cutting method is etching, it is carried out after forming the resist pattern on the flow path forming surface of the first silicon wafer having grooves for flow paths. Therefore, the deep grooves having a depth larger than the ink discharging flow path grooves can be formed with high accuracy.

Furthermore, a spray coating method may be used for coating the resist on the flow path forming surface.

The resist cannot be well formed by an ordinary resist forming method on the flow path forming surface having the grooves for flow paths due to unevenness thereon. Therefore, in this case, the resist can be formed on the groove forming surface with unevenness in good conditions by using a spray coating method.

Furthermore, the non-contact cutting method is etching, and in the case where penetration is carried out from one side to the other side of the conjugated body, a protective film may be provided on the other side.

In this case, if penetration is carried out from one side to the other side of the conjugated body, an electrode of an etching apparatus is prevented from being exposed to a plasma upon penetration by providing a protective film on the other side.

Furthermore, the protective film may be an $SiO_2$ film.

When the protective film is an $SiO_2$ film, it can be easily formed on the silicon wafer.

Furthermore, the step of thinning the silicon wafer from the back surface is carried out in such a state that a resin material is filled in at least a part of the grooves for flow paths provided on the first silicon wafer, and the resin material is removed after the step.

When the thickness of the silicon wafer is thinned in such a state that a resin material is filled in at least a part of the grooves for flow paths provided on the first silicon wafer, foreign matters formed in the step of thinning the silicon wafer are prevented from invading into the grooves for flow paths to hinder supply of an ink.

The invention also relates to, as a further aspect, an ink jet recording head having a head chip containing respective flow paths each having an ink discharging outlet for discharging an ink at an tip end thereof, a common liquid chamber supplying an ink to the respective flow paths and plural ink supplying inlets for supplying an ink from outside to the common liquid chamber. The ink supplying inlets have a trap structure trapping foreign matters from outside into the common liquid chamber and clog the respective flow paths.

Because the ink supplying inlets of the head chip has a trap structure trapping foreign matters that invade from outside into the common liquid chamber and clog the respective flow paths, the foreign matters from outside clogging the respective flow paths are certainly prevented from invading into the common liquid chamber. Foreign matters that do not clog the respective flow paths can be drained from the ink discharging outlets to the outside along with the ink.

Furthermore, an opening area of the ink supplying inlets may be smaller than a cross sectional area of the respective flow paths.

Because the opening area of the ink supplying inlets is smaller than the cross sectional area of the respective flow paths, foreign matters clogging the respective flow paths can be prevented from invading from the ink supplying inlets to the interior of the common liquid chamber.

The number of the ink supplying inlets may be larger than a maximum number the respective flow paths having ink discharging outlets on tip ends thereof that simultaneously eject an ink.

In the case where the opening area of the ink supplying inlets is smaller than the cross sectional area of the respective flow paths, there is a possibility that the supply of an ink to the respective flow paths cannot follow discharge of the ink. According to the embodiment, shortage of the supply amount of the ink is avoided by making the number of the ink supplying inlets larger than a maximum number the respective flow paths having ink discharging outlets on tip ends thereof that simultaneously eject an ink.

Furthermore, the ink supplying inlets may be formed on two or more surfaces of the head chip.

In this case, the ink supplying inlets are opened on two or more surfaces of the head chip, whereby the number of the ink supplying inlets can be assured. Furthermore, even when the ink supplying inlets on one surface are clogged by foreign matters, an ink can be supplied to the common liquid chamber through the ink supplying inlets on the other surface.

Furthermore, the ink supplying inlets may be opened on a side of the common liquid chamber opposite to a side where the respective flow paths are opened.

In this case, in the common liquid chamber, the ink supplying inlets are opened on the opposite side to the side where the respective flow paths are opened, whereby pressure vibration in the common liquid chamber upon discharging an ink is relaxed to improve the ink discharging performance, and the common liquid chamber can be further miniaturized owing to the relaxation of pressure vibration.

In an ink jet recording head formed by accumulating a flow path substrate having grooves for supplying an ink formed thereon and an ejecting element substrate having ink ejecting elements arranged thereon, it is possible that a nozzle forming surface, on which ink discharging outlets are opened, is formed by the processes according to the invention.

In this case, the nozzle forming surface can be formed with high accuracy, and cracking of the substrate constituting the ink discharging outlets can be prevented, whereby a desired printing performance can be assured.

It is also possible that a depth of the common liquid chamber in a direction perpendicular to the respective is 500 μm or less.

In this case, owing to the depth of the common liquid chamber of 500 μm or less, the thickness of the conjugated body can be decreased, and the flow rate of the ink is increased by reducing the capacity of the common liquid chamber, so as to suppress growth of bubbles inside the common liquid chamber.

It is also possible that the ink jet recording head further contains an ink supplying chamber for storing an ink to be supplied to the head chip, and an ink supplying member having an opening for loading the head chip formed on one wall surface of the ink supplying member, and the head chip is loaded on the opening, whereby the nozzle forming surface is exposed to outside, and the head chip is exposed inside the ink supplying chamber.

In this case, because the ink supplying inlets are exposed inside the ink supplying chamber, the ink is smoothly supplied from the ink supplying inlets to the common liquid chamber. In the case where the ink supplying chamber is opened in the gravitationally upper direction by the ink supplying inlets, bubbles grown in the common liquid chamber moves into the ink supplying chamber by buoyancy to prevent the ink supplying inlets from clogging.

When an ink jet recording apparatus is equipped with the ink jet recording head of the invention, the ink jet recording apparatus can be miniaturized, and the nozzle end surface is formed with high accuracy to improve the printing performance.

BRIEF DESCRIPTION OF THE DRAWINGS

FIGS. 6A1 and 6B1 are diagrams showing dicing conditions of the first embodiment of the invention and a comparative example, and FIGS. 6A2 and 6B2 are diagrams showing conditions of cutting edges of cutting blades used in dicing in respective cases.

DESCRIPTION OF THE PREFERRED EMBODIMENTS

First Embodiment

An ink jet recording head, an ink jet recording apparatus and a process for producing the head according to a first embodiment of the invention will be described.

The ink jet recording head will be described with reference to FIGS. 1A to 6B2.

Figure 1A:
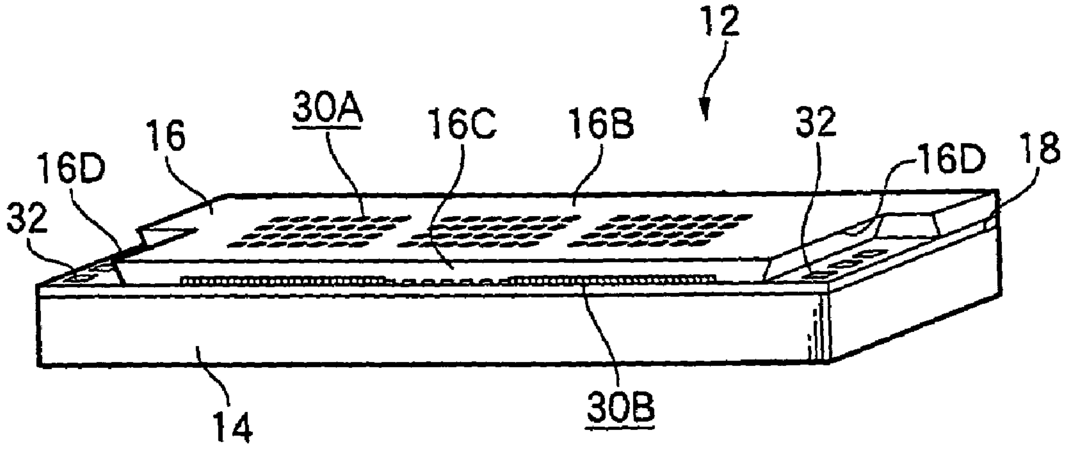
FIG. 1A is a perspective view showing a back surface of a head chip according to a first embodiment of the invention.
Figure 1B:
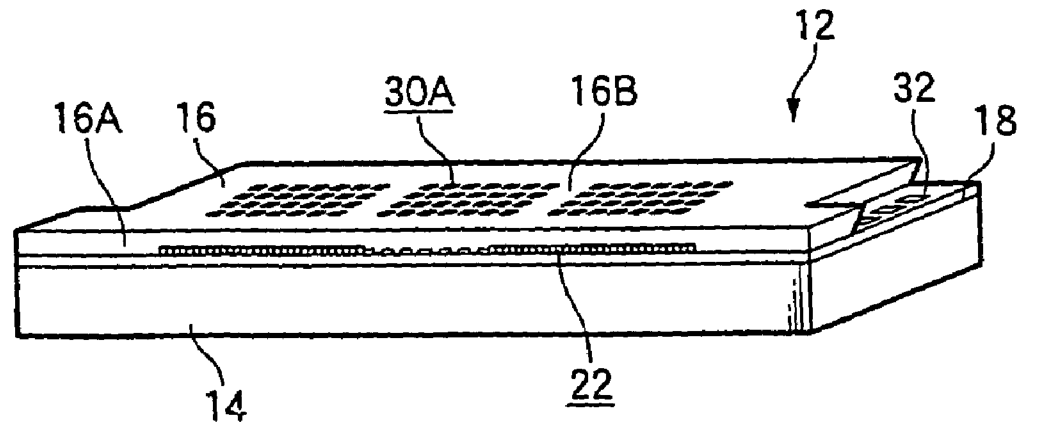
FIG. 1B is a perspective view showing a front surface of the head chip.
Figure 2A:
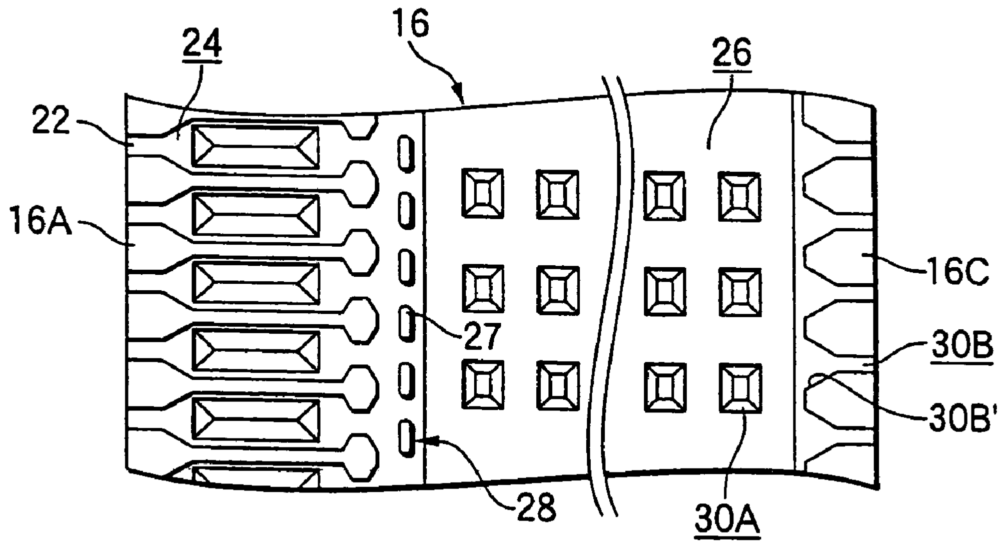
FIG. 2A is a plane view showing a flow path substrate.
Figure 2B:
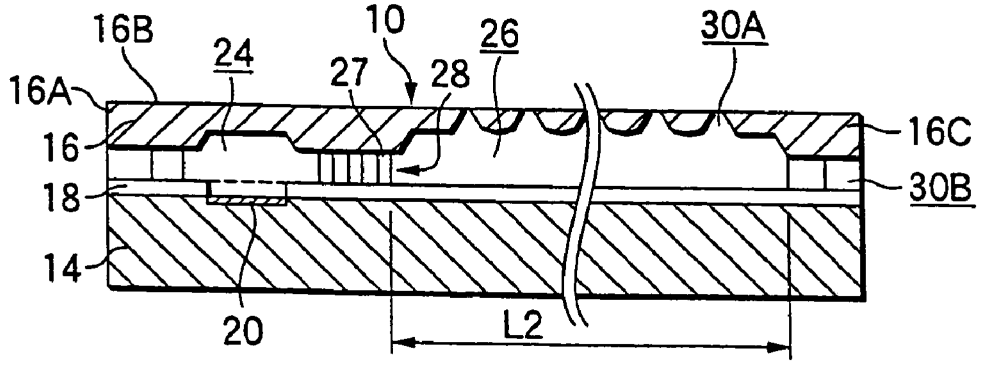
FIG. 2B is a vertical cross sectional view showing the head chip.

A head chip 12 constituting an ink recording head 10 is formed by accumulating a flow path substrate 16 having ink flow paths formed thereon and a heater element substrate 14 having heater elements 20 (as shown in FIG. 2B) for discharging an ink, as shown in FIGS. 1A and 1B.

A protective layer 18 for protecting circuits and the like from the ink is formed on the surface of the heater element substrate 14, and the heater elements 20 for discharging ink droplets by heating the ink are arranged on a part thereof.

The flow path substrate 16, which is to be accumulated on the heater element substrate 14, has formed thereon respective flow paths 24 supplying an ink to nozzles 22 opening on an accumulated end surface (hereinafter sometimes referred to as a nozzle end surface) 16A, and a common liquid chamber 26 on a back end of the respective flow paths 24. In the common liquid chamber 26, columnar bodies 27, which have a width that is the substantially same as the width of the respective flow paths 24, are arranged in the vicinity of the respective flow paths 24 in the arranging direction of the respective flow paths, so as to constitute a filter part 28 for the supplied ink on the mid flow from the common liquid chamber 26 to the respective flow paths 24. Therefore, even when foreign matters clogging the respective flow paths 24 invade into the common liquid chamber 26, they are trapped at the filter part 28 but do not clog the respective flow paths 24, and thus the ink is stably supplied to the respective flow paths 24.

A large number of ink supplying inlets 30A and 30B are formed on an upper surface 16B perpendicular to the accumulated end surface 16A and on a back surface 16C opposite to the accumulated end surface 16A. The ink supplying inlets 30A and 30B also have a trap structure for preventing foreign matters clogging the respective flow paths 24 from flowing from a subsidiary ink tank 36 described later and invading into the common liquid chamber 26. For example, it is such a structure exhibiting a filter function that the opening area of the ink supplying inlets 30A and 30B is equal to or smaller than the cross sectional area of the respective flow paths 24. In this case, it is necessary that the number of the ink supplying inlets 30A and 30B is larger than the maximum number of the respective flow paths 24 that are simultaneously used for printing, and it is preferably larger than the total number of the respective flow paths 24.

The common liquid chamber 26 is connected to a subsidiary ink chamber 40 of the subsidiary ink tank 36 described later through the ink supplying inlets 30A and 30B by attaching the head chip 12 to the subsidiary ink tank 36.

On both end surfaces in the longitudinal direction of the flow path substrate 16, notches 16D are formed on the back end of the nozzles, as shown in FIG. 1A, and input and output terminals 32 formed on the heater element substrate 14 are exposed on the surface through the notches 16D and are connected to circuits of a heat sink 34 described later.

Figure 3:
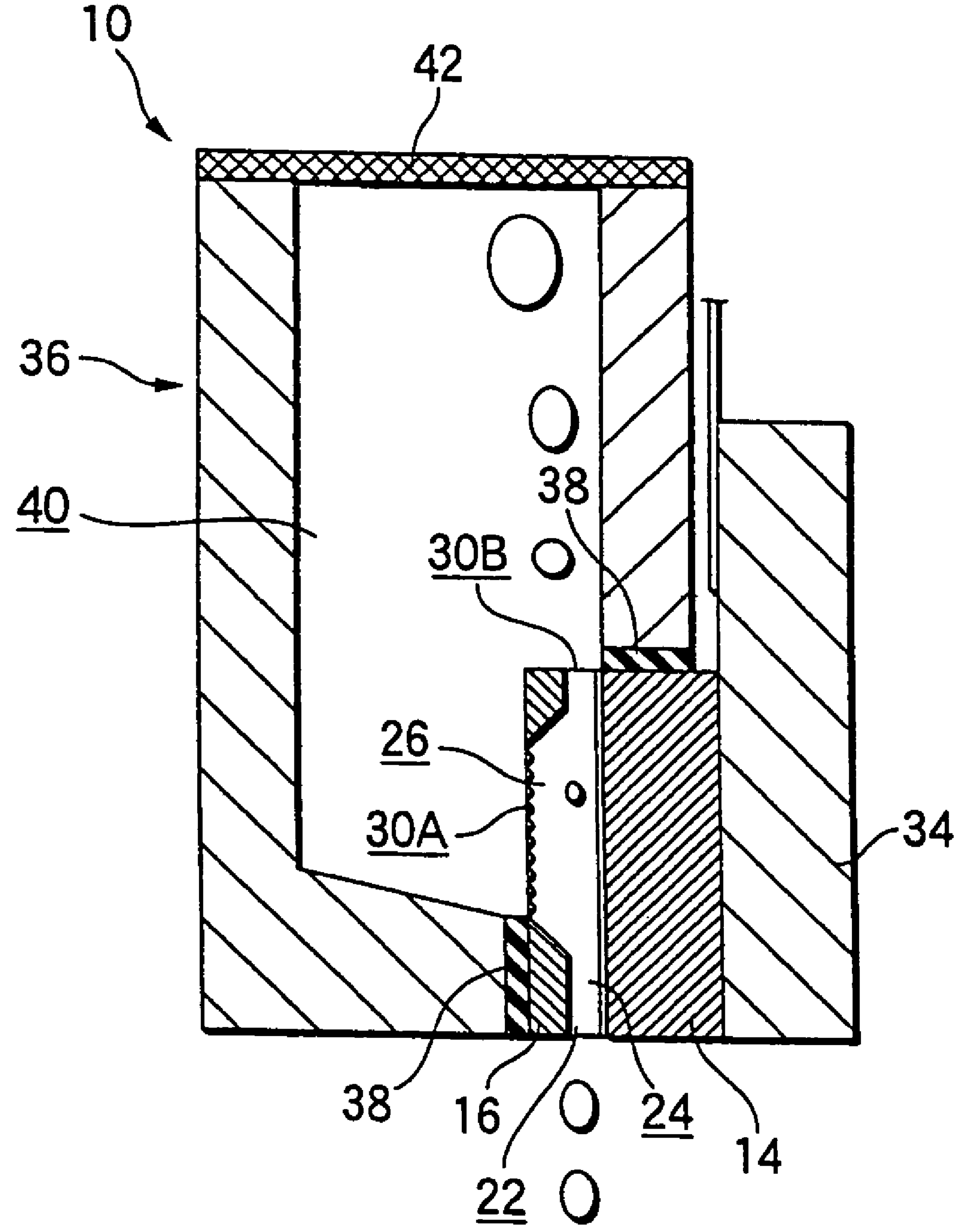
FIG. 3 is a vertical cross sectional view showing an ink jet recording head according to the first embodiment of the invention.

The ink jet recording head 10 is constituted by attaching the thus produced head chip 12 to the subsidiary ink tank 36 as shown in FIG. 3. That is, the heater element substrate 14 of the head chip 12 is fixed on the heat sink 34 and attached with pressure to a tip end of the subsidiary ink tank 36 through an elastic seal member 38, whereby the common liquid chamber 26 is connected to the subsidiary ink chamber 40 of the subsidiary ink tank 36. The subsidiary ink chamber 40 is connected to an ink tank (not shown in the figure) through a filter 42.

The subsidiary ink tank 36 exerts a function of supplying an ink from the ink tank to the common liquid chamber 26 and at the same time, exerts the similar function as the ink tank because the subsidiary ink chamber 40 has a simple structure (i.e., a substantial rectangular parallelepiped shape) to improve both the ink supplying property and the ink evacuating property, and it has such a sufficient capacity (cross sectional area) that the ink can be certainly supplied to the common liquid chamber 22 even when bubbles are present in the subsidiary ink chamber.

The ink jet recording head containing the thus produced head chip 12 will be described along with the production process of the head chip.

Figures 4A, 4B, 4C, 4D, 4E, 4F:
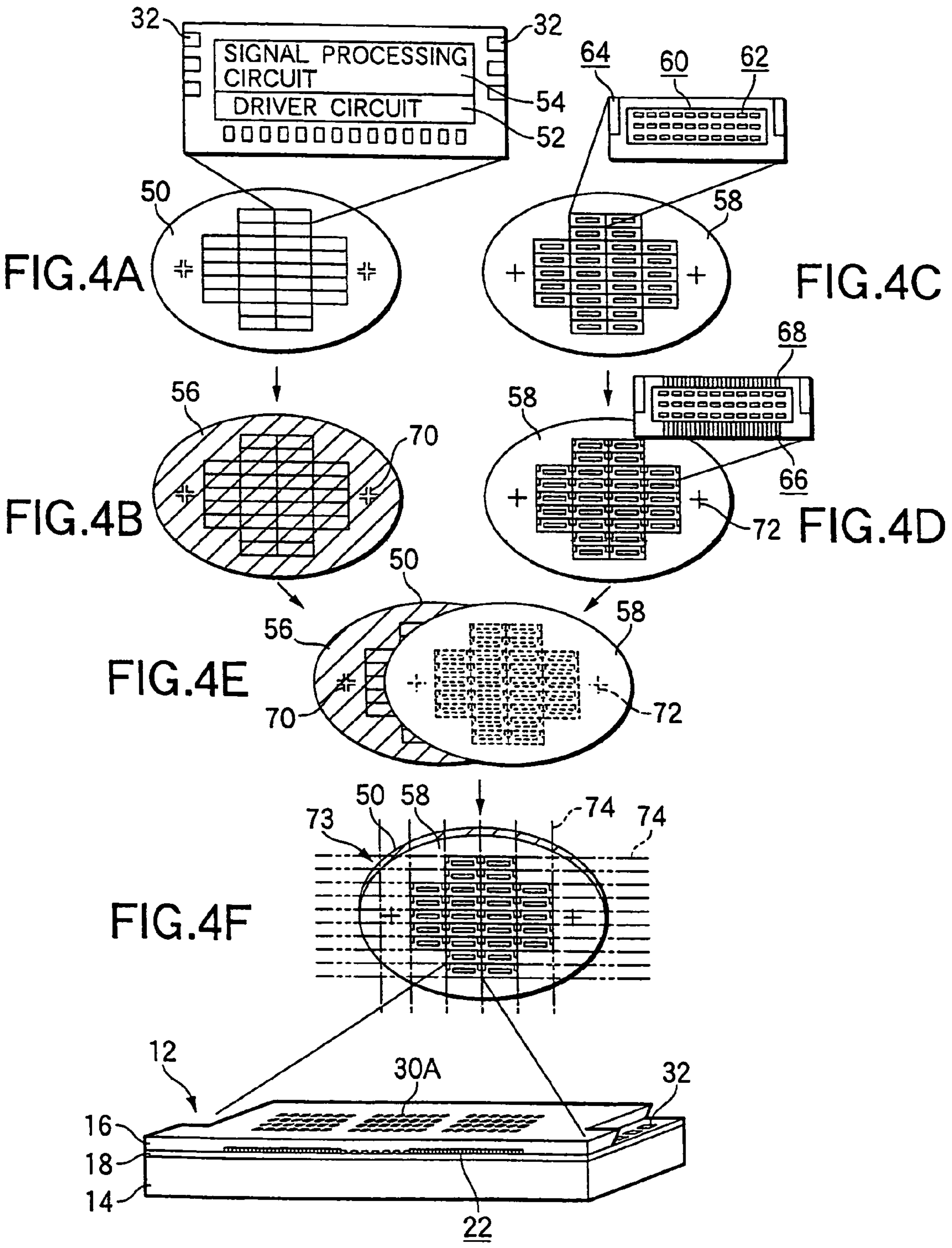
FIGS. 4A to 4F are diagrams showing process steps for producing a head chip according to the first embodiment of the invention.

The heater element substrate 14 can be produced, for example, by using the production technique and the production apparatus for an LSI. Specifically, a heater layer containing a heat regenerating layer and a heater element, and a protective layer for preventing the heater element from breakage due to pressure of bubbles formed by heat generation of the heater element are accumulated on a single crystal silicon wafer 50 (as shown in FIG. 4A). Signal lines for supplying electric power and signals from outside are connected to a heater layer. Driver circuits 52, signal processing circuits 54 and external signal input and output terminals 32 are similarly formed for the plural heads. As a protective layer to an ink, a resin layer 56, such as photosensitive polyimide, is accumulated (as shown in FIG. 4B).

The flow path substrate 16 can also be produced in the similar manner as the heater element substrate 14. Specifically, grooves 60, 62 and 64 to be the common liquid chambers 26, the ink supplying inlets 30 and notches 16D, respectively, are formed on a silicon wafer 58, for example, by orientation dependent etching (as shown in FIG. 4C). Furthermore, grooves 66 and 68 to be the respective flow paths 24 and the ink supplying inlets 30B are formed by a reactive ion etching (RIE) disclosed in JP-A-11-227208 (As shown in FIG. 4D).

The two silicon wafers 50 and 58 are positioned with accuracy with positioning marks 70 and 72, and conjugated, for example, in a manner disclosed in JP-A-2001-129799 (as shown in FIG. 4E).

Figure 5:
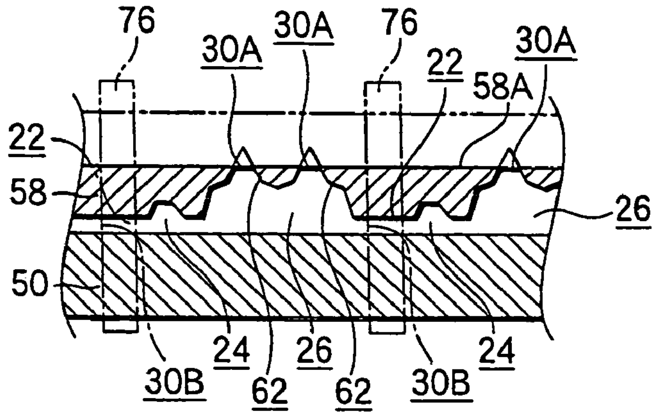
FIG. 5 is a vertical cross sectional view showing the process step shown in FIG. 4F.

The conjugated silicon wafers (hereinafter referred to as a conjugated body) 73 is subjected to a step of decreasing the thickness by grinding or etching from the back surface of the flow path substrate (shown by the broken lines) as shown in FIG. 5. According to the step, the non-penetrated grooves 62 and 64 provided on the silicon wafer 58 are penetrated to the back surface 58A of the silicon wafer 58 to be the ink supplying inlets 30A and the notches 16D, respectively.

Thereafter, the conjugated silicon wafers are cut and separated into a dice form along dicing lines 74, for example, by a method disclosed in Japanese Patent No. 2,888,474, to produce plural head chips 12 at the same time (as shown in FIG. 4F). As shown in FIG. 5, the end parts of the respective flow paths 24 are opened by the cutting (dicing) to be the nozzles 22 discharging ink droplets, and at the same time, the back ends of the grooves 68 are also opened to be the ink supplying inlets 30B.

The ink supplying inlets 30A opening on the upper surface of the head chip 12 are penetrated by grinding or etching, and in the case where they are penetrated by grinding, in particular, a head chip 12 of further high quality can be produced by filling a removable resin layer or the like in the grooves for preventing invasion of grinding dusts in the head chip 12 (common liquid chamber 26) and cracking of the opening parts. This is also preferred in the dicing step from the standpoint of securement of working quality of the nozzles 22 and prevention of invasion of grinding dusts into the head chip 12.

The resin layer to be filled is not particularly limited, and a novolak resin is most preferred under consideration of grinding property in the grinding step.

It is also preferred that the nozzle 22 of one of the adjacent head chips 12 and the ink supplying inlet 30B of the other head chip are simultaneously formed by a single operation of dicing 76 as shown in FIG. 5.

Furthermore, it is preferred in the conjugated body 73 that the groove 66 for forming the nozzle 22 of one head chip and the groove 68 for forming the ink supplying inlet 30B of the adjacent head chip are formed to be connected to each other. According to the configuration, the pattern of the cut part with respect to the cutting blade becomes uniform in the thickness direction of the blade, and the wear in the thickness direction of the blade becomes uniform. As a result, head chips of high shape accuracy can be produced with high positional accuracy by cutting the conjugated body 73.

The functions noted in the foregoing will be described by comparing to a comparative example with reference to FIGS. 6A1 to 6B2.

Figure 6:
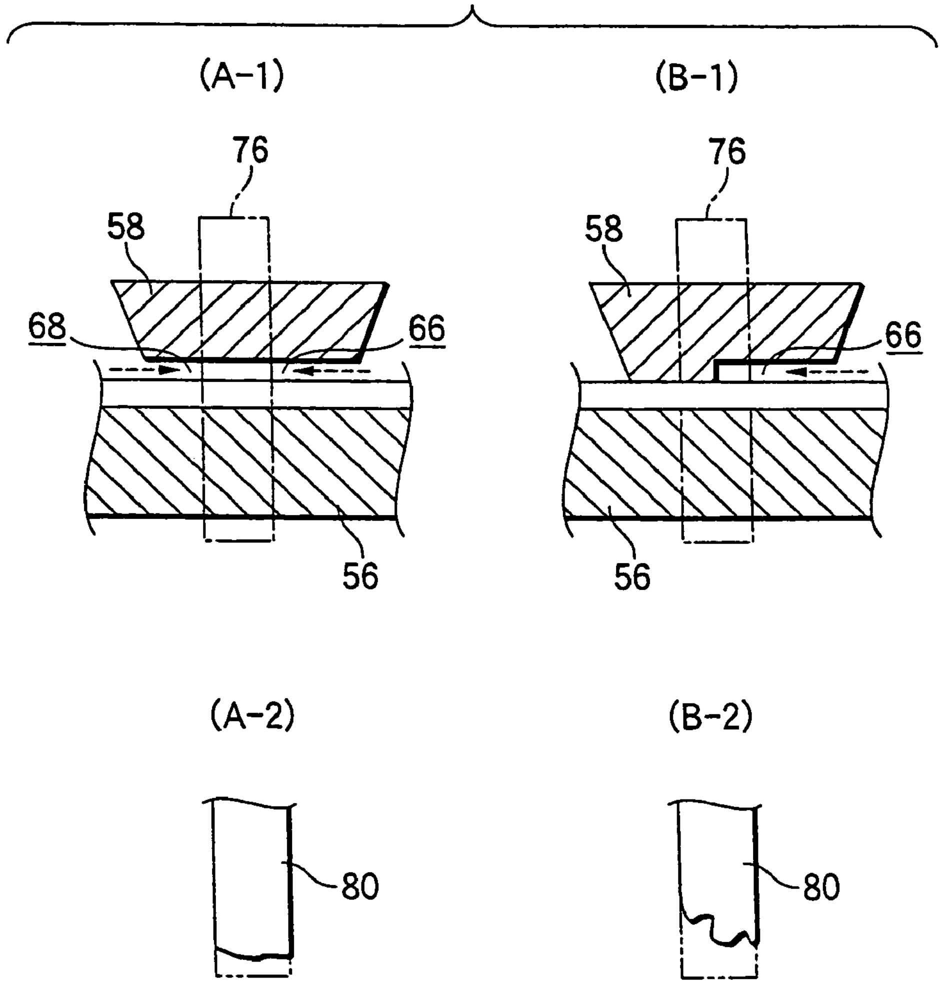

Specifically, in a comparative example (conventional example) having only grooves 66 for respective flow paths 24 (nozzle 22), dicing 76 for opening the nozzles 22 overlaps the end position of the grooves 66 as shown in FIG. 6B1, whereby the shape of the grinding blade 80 is disrupted with the progress of grinding as shown in FIG. 6B2, and the grinding blade 80 is bent as shown in the arrow in the figure to cause adverse affects on the grinding position and the outer shape of the head chips.

On the other hand, in the case where the grooves 66 and the grooves 68 are connected to each other as in this embodiment (as shown in FIG. 6A1), the groove pattern in the thickness direction of the grinding blade 80 upon dicing 76 is uniform, and disruption of the shape of the grinding blade 80 due to wear can be suppressed as shown in FIG. 6A2.

It is also possible in the comparative example that the pattern becomes uniform in the thickness direction of the grinding blade in such a manner that the distances of the head chips are made large to make the dicing position for opening the nozzles to overlap the grooves in the thickness direction of the grinding blade, and the back end dicing position to be the adjacent head chip is set at a part having no groove. In this case, however, the number of dicing (grinding length) is increased to multiply the cutting time, and wear of the cutting blade is accelerated. It is also necessary to obtain excessive distances among the head chips, whereby the yield of head chips per one silicon wafer is considerably decreased, and as a result, the production cost of the head chips is increased. Therefore, the production process according to this embodiment is preferred.

In the case where the cutting and separating step (dicing) is carried out without the resin filled in the grooves, water is supplied to the side surfaces of the blade from both the groove 66 and groove 68 upon grinding (as shown by the broken line arrows in FIG. 6A1) by connecting the groove 66 and groove 68 to be head chips adjacent to each other, and clogging of the blade and temperature increase upon grinding are suppressed in comparison to the comparative example, in which water is supplied only from the groove 66 (as shown by the broken line arrow in FIG. 6B1), whereby grinding can be carried out with good working quality.

Furthermore, the ink supplying inlets 30B of the head chip 12 according to the embodiment also function as a bumper for absorbing and relaxing pressure, which is generated in the respective flow paths 24 upon discharging an ink, and acts on the side of the common liquid chamber. When the ink jet recording head 10 is constituted as shown in FIG. 3, the ink supplying inlets 30B are directly opened on the subsidiary ink chamber 40 of the subsidiary ink tank 36, and reflection of pressure waves to the respective flow paths 24 is suppressed by a taper surface 30B' having a prescribed angle in the common liquid chamber (as shown in FIG. 2A), whereby the bumper function is further improved.

In the ink jet recording head 10 thus constituted, because the ink supplying inlets 30A are opened by decreasing the thickness of the silicon wafer 58 upon production, the thickness of the silicon wafer 58 (i.e., the capacity of the common liquid chamber 26) can be decreased in comparison to the case where they are opened only by etching from the side of the flow path forming surface as in the conventional cases.

Furthermore, because the influence of pressure vibration upon discharging an ink in the head chip 12 is suppressed (absorbed and relaxed) by the ink supplying inlets 30B, the capacity of the common liquid chamber 26 (i.e., the depth of the common liquid chamber shown by L2 in FIG. 2B) can be smaller than the conventional cases.

Accordingly, because the head chips 12 are thus miniaturized, the yield of the head chips 12 per one silicon wafer can be vastly improved, and the cost of the head chips 12 can be reduced.

By the reduction of the capacity of the common liquid chamber 26, the flow rate of the ink in the common liquid chamber is increased, whereby the dead water regions are reduced, and bubbles formed in the common liquid chamber 26 are evacuated from the nozzles 22 before growth of the bubbles. Therefore, such an effect is also improved that a defect of hindering supply of an ink by the grown bubbles clogging the respective flow paths 24 or the ink supplying inlets 30A and 30B (hereinafter referred to as a bubble retention defect) is suppressed.

Accordingly, in the common liquid chamber 26 that can be assumed to be equivalent to the respective flow paths 24, even when a temporary printing defect due to bubbles is caused by increasing the ink flow rate, they do not grow into such bubbles that hinder supply of the ink to the respective flow paths 24 for a long period of time. Therefore, the aspiration operation for removing bubbles is not necessary, and thus there is no unnecessary consumption of the ink.

Even in the case where the bubble retention defect occurs, the bubbles can be removed only by aspiration of a small amount of the ink from the nozzles 22.

Second Embodiment

An ink jet recording head according to a second embodiment of the invention will be described. The same constitutional elements as in the first embodiment are attached with the same reference symbols, and detailed descriptions thereof are omitted.

Figure 7A:
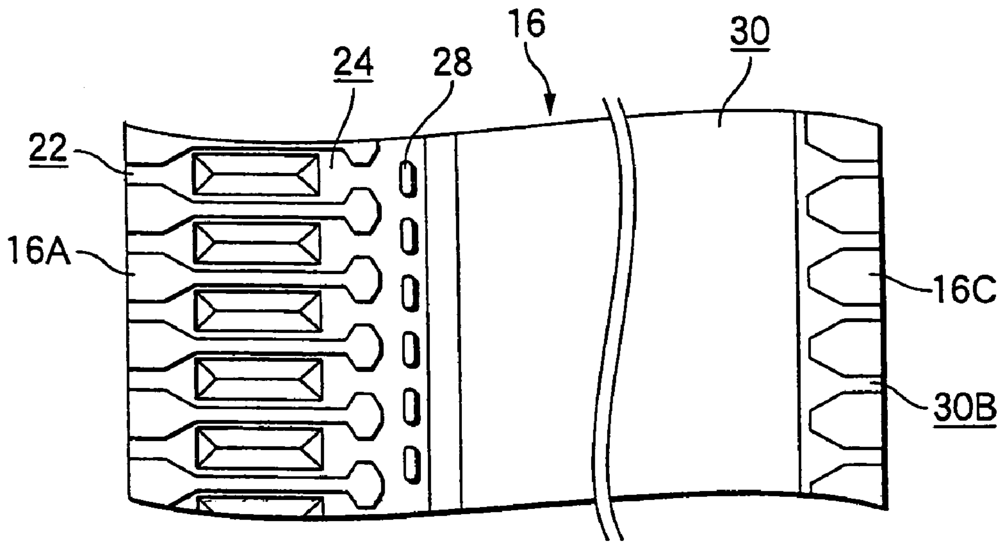
FIG. 7A is a plane view showing a flow path substrate constituting a head chip according to a second embodiment of the invention.
Figure 7B:
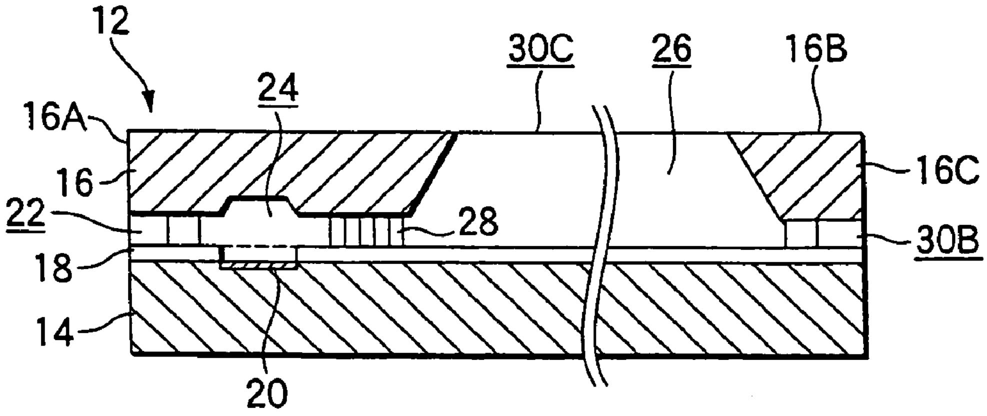
FIG. 7B is a vertical cross sectional view showing the head chip.

In a head chip 12 according to this embodiment as shown in FIGS. 7A and 7B, one rectangular ink supplying inlet 30C present along the arranging direction of the nozzles is formed instead of the ink supplying inlets 30A having the filter function formed on the upper surface of the flow path substrate 16.

The production process of the head chip 12 is the same as the production process of the first embodiment (but the step of decreasing the thickness of the substrate by etching is omitted). That is, the flow path substrate 16 of this embodiment can be produced, for example, by the two steps of orientation dependent etching (ODE) and the one step of reactive ion etching (RIE), but it is not limited thereto.

In the head chip 12 of this embodiment, while the ink supplying inlet 30C on the upper surface does not have the filter function, the miniaturization of the common liquid chamber 26 is attained by the pressure bumper function of the ink supplying inlets 30B, and the bubble retention defect is suppressed, as similar to the first embodiment.

As it has been described with reference to FIGS. 6A1 to 6B2 for the first embodiment, the grooves for the respective flow paths 24 and the ink supplying inlets 30B are provided as being connected to each other, and they are separated by the same process step, whereby the grinding accuracy upon working the nozzles is also improved.

Third Embodiment

An ink jet recording head according to a third embodiment of the invention will be described. The same constitutional elements as in the first embodiment are attached with the same reference symbols, and detailed descriptions thereof are omitted.

Figure 8A:
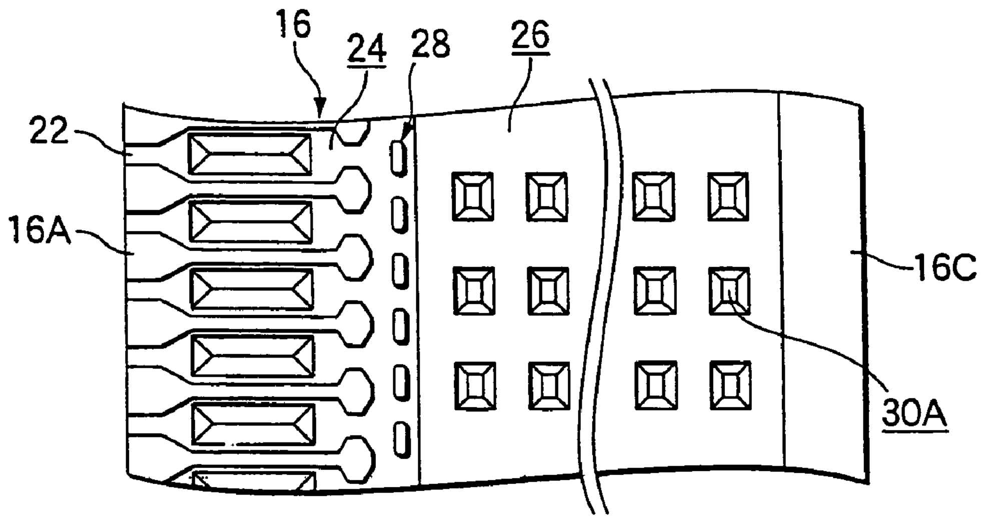
FIG. 8A is a plane view showing a flow path substrate constituting a head chip according to a third embodiment of the invention.
Figure 8B:
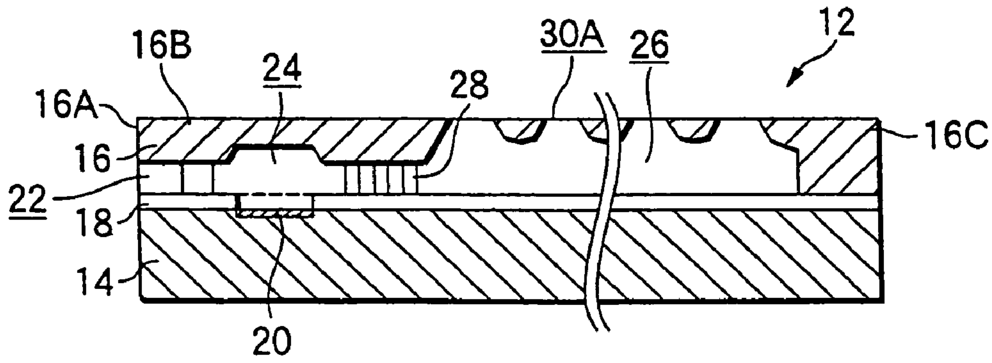
FIG. 8B is a vertical cross sectional view showing the head chip.

A head chip 12 of this embodiment as ink supplying inlets 30A having a filter function only on the upper surface 16B as shown in FIGS. 8A and 8B. In other words, no ink supplying inlet is provided on the back surface 16C.

The production process of the head chip is the same as in the first embodiment.

Therefore, in the head chip 12, although the pressure bumper function is not obtained, foreign matters that adversely affects the supply of an ink to the respective flow paths 24 can be certainly prevented from invading into the common liquid chamber 26 by the filter function of the ink supplying inlets 30A. Because the ink supplying inlets 30A are opened by decreasing the thickness of the flow path substrate 16 (silicon wafer 58), the total capacity of the common liquid chamber 26 and the dead water regions in the common liquid chamber can be miniaturized, whereby the bubble retention defect can be easily suppressed, and recovery therefrom can be easily carried out.

Figure 9:
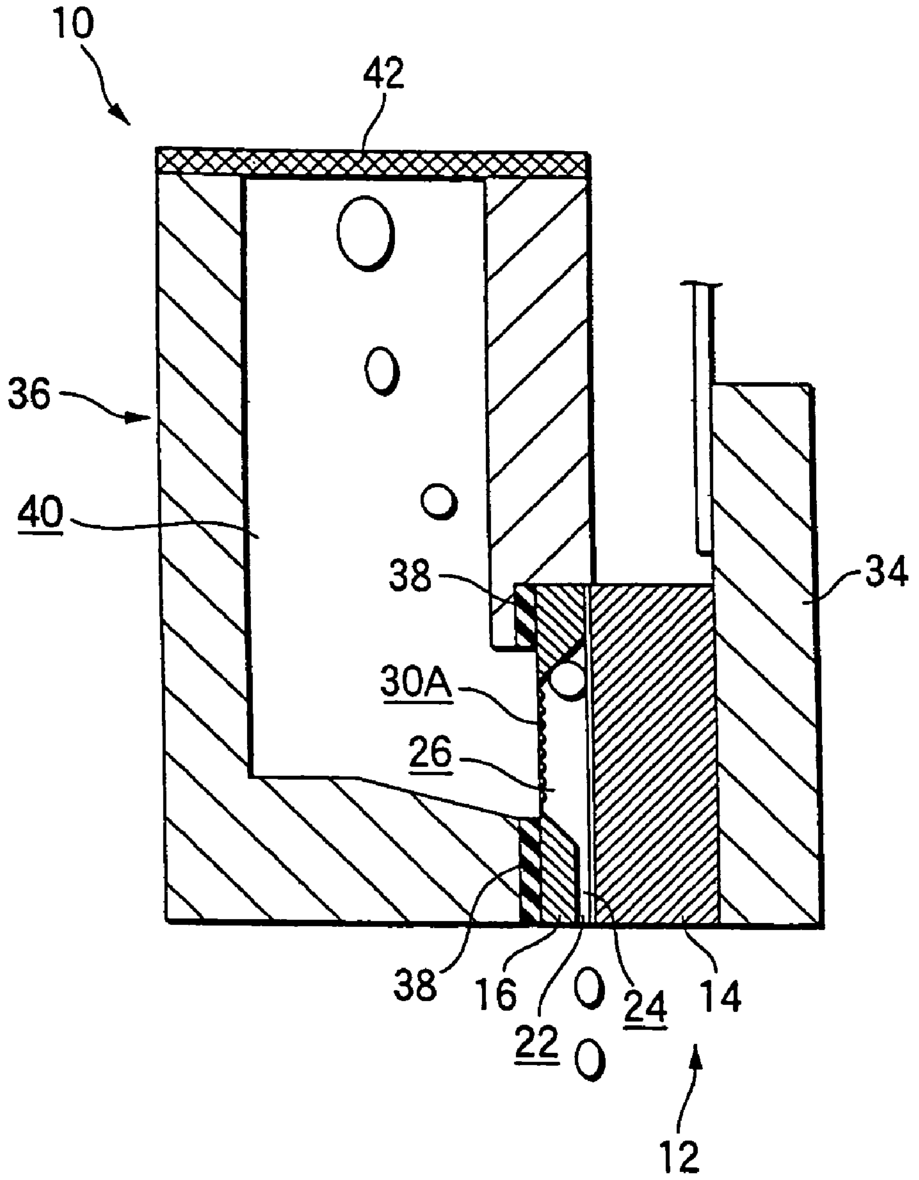
FIG. 9 is a vertical cross sectional view showing an ink jet recording head according to the third embodiment of the invention.

The head chip 12 thus formed constitutes an ink jet recording head 10 by attaching to a subsidiary ink tank 36 as shown in FIG. 9. The ink jet recording head 10 exerts the same functional effect as in the first embodiment, and also has such an advantage that because the ink supplying inlets 30A are provided only on the upper surface 16B of the head chip 12, a seal on only one direction with an elastic seal member 38 is sufficient to simplify the fabrication process steps.

Fourth Embodiment

An ink jet recording head according to a fourth embodiment of the invention will be described. The same constitutional elements as in the first embodiment are attached with the same reference symbols, and detailed descriptions thereof are omitted. This embodiment is different from the first embodiment only in the production process, and only the corresponding parts will be described herein.

Figure 10A:
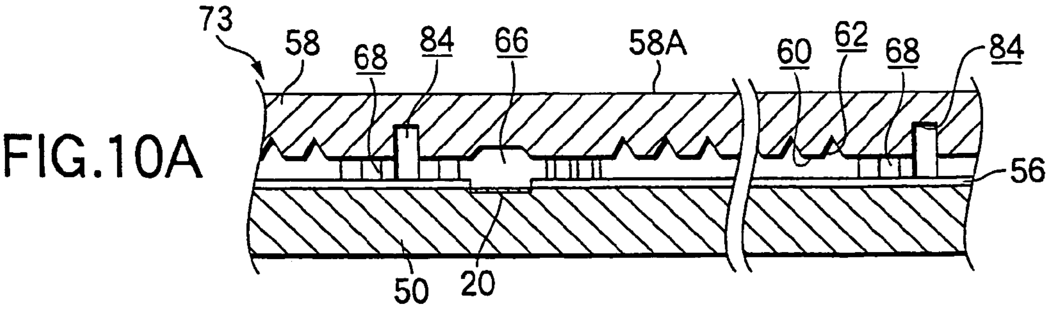
FIGS. 10A to 10E are diagrams showing process steps for producing a head chip according to the fourth embodiment of the invention.
Figure 10B:
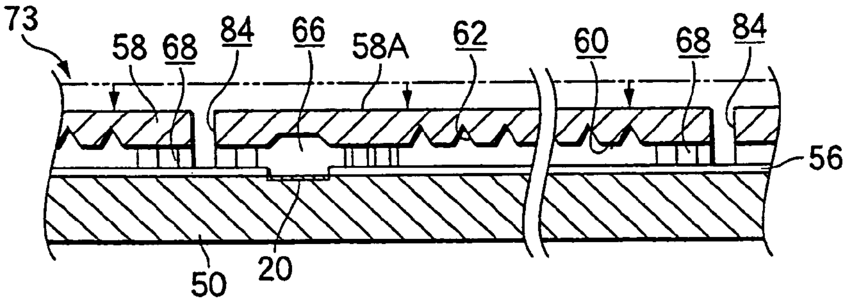
Figure 10C:
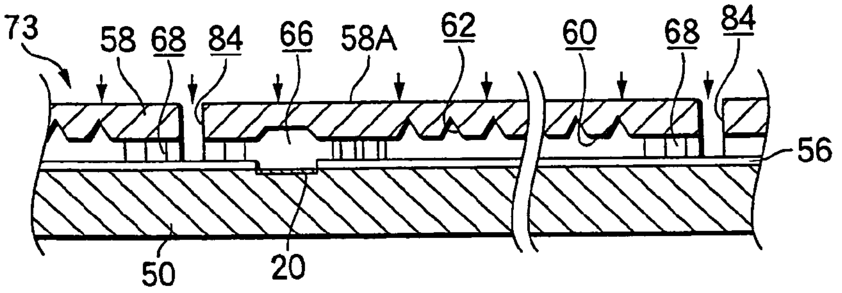
Figure 10D:
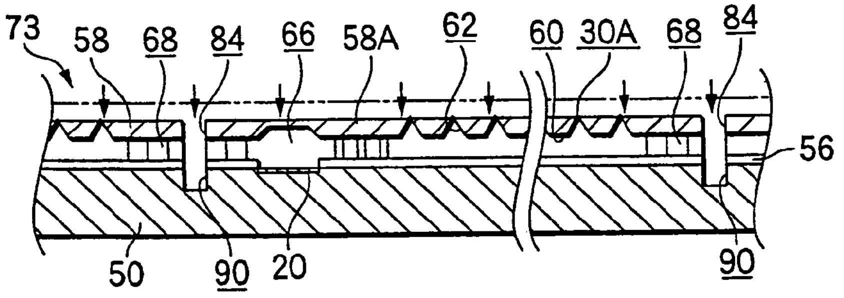
Figure 10E:
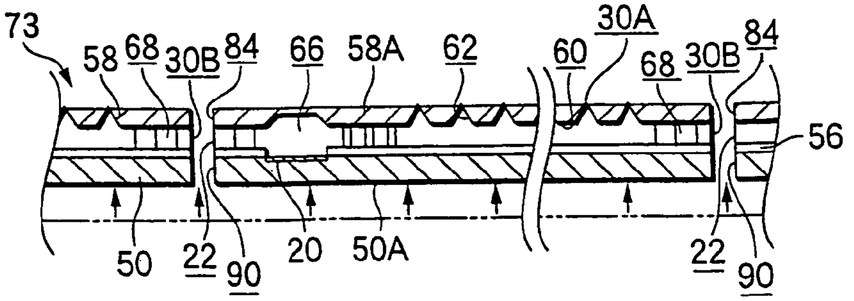
Figure 11:
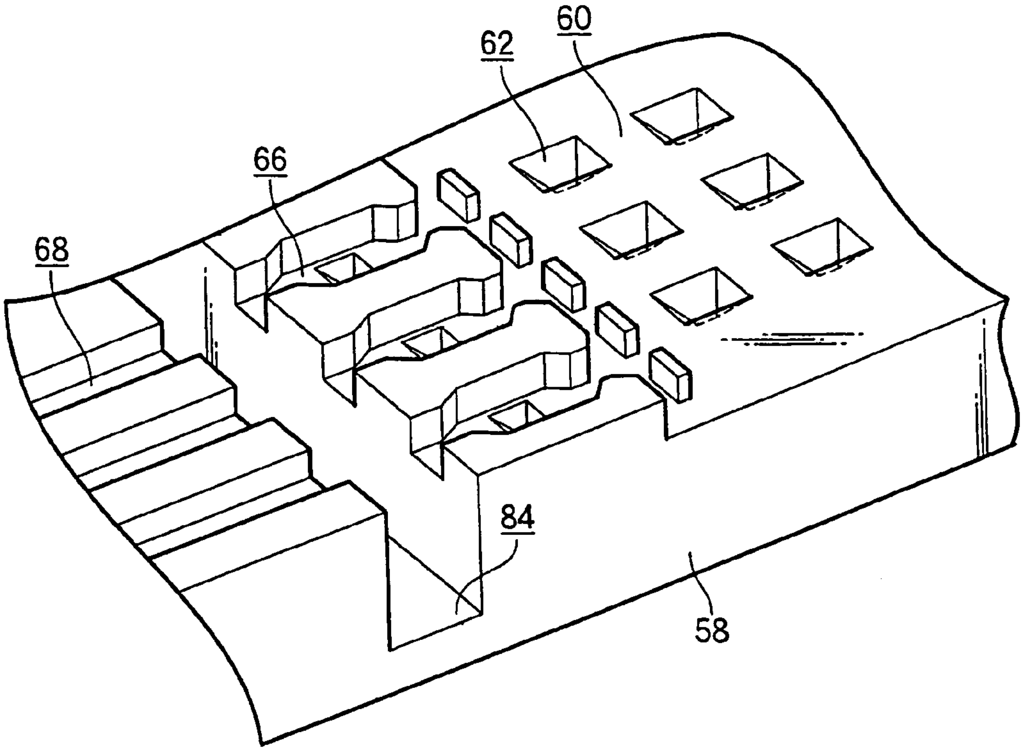
FIG. 11 is a perspective view showing a state where deep grooves are formed on a silicon wafer.

As shown in FIGS. 10A to 10E and 11, on a silicon wafer 58 having grooves 66, 60, 62 and 68 formed thereon for respective flow paths 24, a common liquid chamber 26 and ink supplying inlets 30A and 30B, deep grooves 84 having a depth larger than the all the other flow path grooves are formed continuously to the grooves for the respective flow paths, and the groove 60 for the common liquid chamber is formed at the back of the grooves 66 for the respective flow paths in the same process step as the grooves 66 for the respective flow paths. In the groove 60 for the common liquid chamber, the grooves 62 are provided by another process step for forming the ink supplying inlets 30A having a filter function (as shown in FIG. 11). In this embodiment, the production is carried out by subjecting the silicon wafer 58 to one step of ODE and two steps of RIE, but it is not limited thereto.

In this embodiment, the silicon wafer 58 containing plural flow path substrates having grooves provided thereon as shown in FIG. 11 and a silicon wafer 50 separately provided and having plural heater element substrates 14 are positioned and then conjugated in the same manner as in the first embodiment (as shown in FIG. 10A).

The thickness of the silicon wafer 58 is then decreased by grinding or etching from an upper surface 58A of a conjugated body 73, and thus only the deep grooves 84 are penetrated on the upper surface 58A (as shown in FIG. 10B).

Subsequently, a resin layer 56 is subjected to oxygen plasma RIE by using the silicon wafer 58 as a mask to remove the resin layer 56 on the parts corresponding to the deep grooves 84 in a perpendicular shape (as shown in FIG. 10C). The etching conditions for RIE herein are a flow rate of an $O_2$ gas of 70 sccm, a pressure of 19.96 Pa (150 mTorr) and a high frequency output of 600 W.

Furthermore, ICP (inductively coupled plasma) RIE is carried out by using an $SF_6/C_4F_8$ gas under such conditions that the silicon wafers 50 and 58 are removed, but the resin layer 56 is not removed. Grooves 90 are formed on the silicon wafer 50 at positions corresponding to the deep grooves 84 (as shown in FIG. 10D). The etching is carried out by about 100 μm herein. The back surface 58A of the silicon wafer 58 is simultaneously etched to open the grooves 62 on the back surface 58A. The etching amounts of the respective steps may be adjusted to open the grooves 62 at this time.

The etching conditions are a temperature of 5° C., a coil output of 500 W and a platen output of 9 W.

Finally, the thickness of the substrate is decreased by etching or grinding from a lower surface 50A of the silicon wafer 50 to penetrate the grooves 90 to the lower surface 50A. In FIGS. 10A to 10E, the deep grooves 84 are shown only in the direction perpendicular to the respective flow paths 24, but the similar deep grooves are also formed in the direction parallel to the respective flow paths 24. Therefore, the plural head chips 12 are separated from the conjugated body 73 by the penetrating step of the grooves 90 (as shown in FIG. 10E).

In the production process of the head chip of this embodiment, while the anisotropic dry etching (RIE) is used in the steps of FIGS. 10C and 10D, other processing methods can be used as far as they are non-contact processing methods having directionality, and for example, laser processing can be employed.

The head chip produced in the foregoing process exerts the same functions as in the first embodiment. The functions obtained in the production process will be described.

In this embodiment, all the nozzle end surfaces 16A are surfaces formed by dry etching in comparison to the method where the nozzle end surfaces 16A are formed (opening the nozzles 22) by dicing for separating the head chips, and therefore, cracking of the silicon wafer constituting the nozzles (hereinafter referred to as cracking of the nozzles) due to direct contact of a machine tool, such as a cutting blade, to the silicon wafer can be prevented. As a result, fluctuation in ink discharging directions due to cracking of the nozzles can be prevented to improve the printing performance.

Furthermore, because the resin layer 56 and the silicon wafer 50 are etched by using the deep grooves 84 as a mask, the nozzle end surfaces 16A, on which the end surfaces of the flow path substrate 16 and the heater element substrate 14 agree to each other, can be formed independent from the accuracy of alignment (conjugation) of the silicon wafers 50 and 58.

Figure 15A:
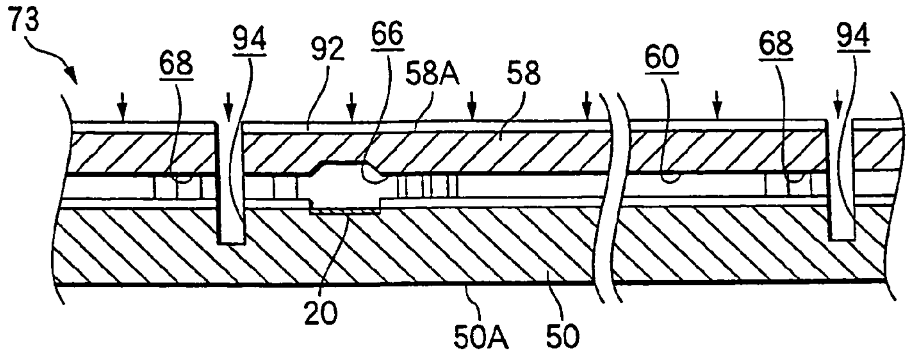
FIGS. 15A and 15B are diagrams showing other process steps for cutting a conjugated body to respective head chip units.
Figure 15B:
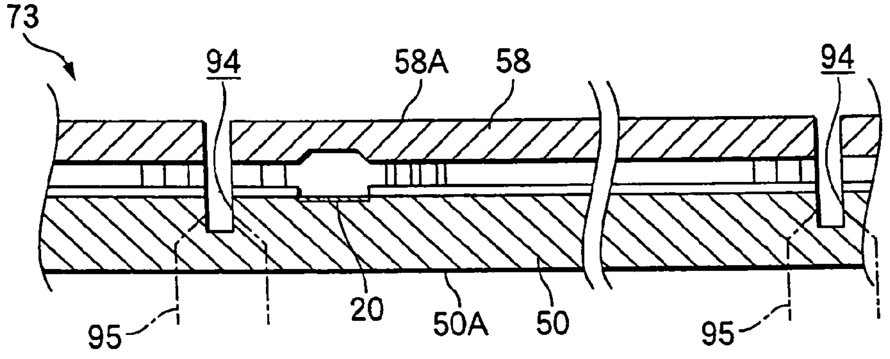

This embodiment is not limited to the foregoing production process, but it is possible that, in the process step in FIG. 10E, the upper surface 58A of the silicon wafer 58 is fixed with a tape, and the deep grooves 84 are penetrated by using a grinding blade having a thickness larger than the deep grooves 84 from the lower surface 50A of the silicon wafer 50 to separate the head chip units (as shown in FIG. 15B).

Figure 16:
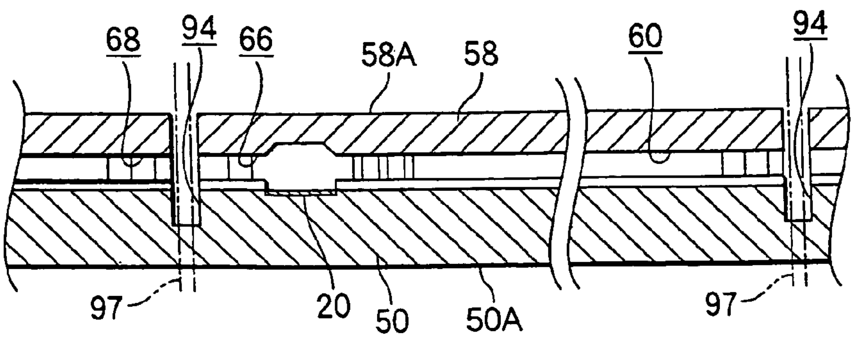
FIG. 16 is a diagram showing another process step for cutting a conjugated body to respective head chip units.

In alternative, it is possible that the grooves 90 can be ground by using a grinding blade having a thickness smaller than the grooves 90 from the side of the silicon wafer 58 to the lower surface 50A of the silicon wafer 50 to separate the head chip units (as shown in FIG. 16). In this process, the nozzle end surfaces 16A around the nozzles 22 are formed by etching, and there is no possibility of cracking of the nozzles 22. The respective chips are separated in a state where they are adhered on a dicing tape, and thus the head chips can be picked up by utilizing the conventional equipments.

In this embodiment, while the head chip 12 thus produced has the ink supplying inlets 30A and 30B having a filter function on the upper surface 16B and the back surface 16C as shown in FIGS. 1A and 1B, it is not limited thereto.

Fifth Embodiment

A process for producing an ink jet recording head (chip head) according to a fifth embodiment of the invention will be described. The same constitutional elements as in the first to fourth embodiments are attached with the same reference symbols, and detailed descriptions thereof are omitted.

Figure 12A:
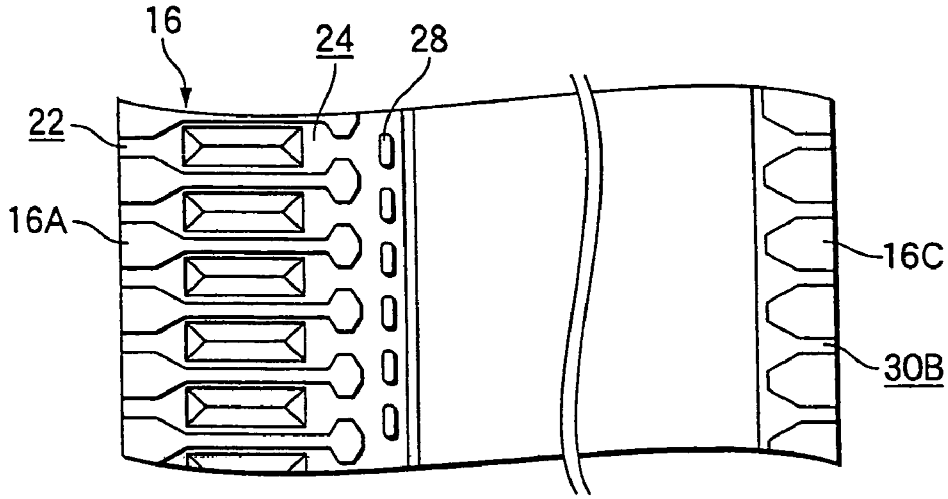
FIG. 12A is a plane view showing a flow path substrate constituting a head chip according to a fifth embodiment of the invention.
Figure 12B:
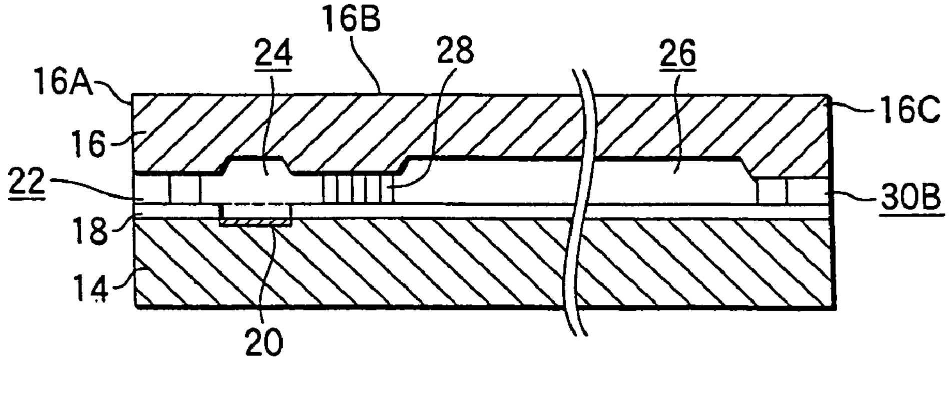
FIG. 12B is a vertical cross sectional view showing the head chip.

The head chip 12 has ink supplying inlets 30B opened only on the back surface 16C as shown in FIGS. 12A and 12B. Therefore, the common liquid chamber 26 only has a length slightly larger than the respective flow paths 24.

According to the configuration, the pressure vibration upon discharging an ink can be relaxed by the ink supplying inlets 30B to miniaturize the common liquid chamber 26, and it is further miniaturized by providing no ink supplying inlet 30A. As a result, the ink flow rate in the common liquid chamber is further increased to hinder growth of bubbles, whereby occurrence of the bubble retention defect can be prevented.

Figure 13:
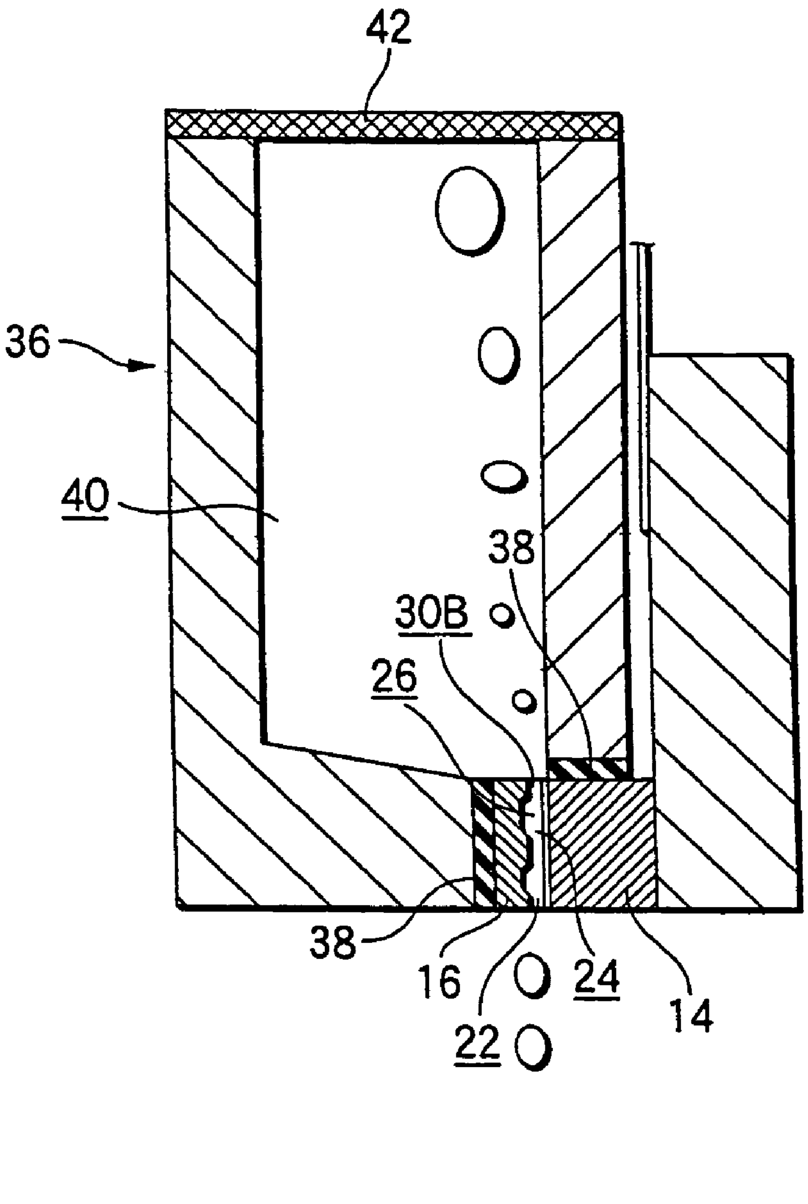
FIG. 13 is a vertical cross sectional view showing an ink jet recording head according to the fifth embodiment of the invention.

Furthermore, in the case where the head chip 12 is attached to a subsidiary ink tank 36 to constitute an ink jet recording head 10 as shown in FIG. 13, bubbles growing in the common liquid chamber 26 move to a subsidiary ink chamber 40 by buoyancy thereof. Therefore, grown bubbles do not clog the ink supplying inlets 30B, and thus supply of an ink is not hindered.

The production process of the head chip 12 thus constituted will be described. What is different from the first embodiment is the step of cutting and separating the conjugated body to the head chip units, and only the corresponding part will be described.

Figure 14A:
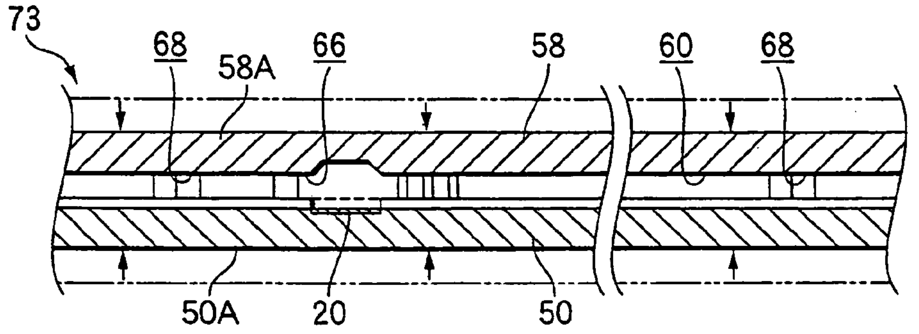
FIGS. 14A to 14C are diagrams showing process steps for cutting a conjugated body to respective head chip units.

The thickness of the conjugated body 73 is decreased by grinding or etching from both surfaces thereof (i.e., the upper surface 58A and the lower surface 50A) (as shown in FIG. 14A).

A resist 92 is coated on one surface of the thinned conjugated body 73, for example, on the upper surface 58A, followed by patterning, and anisotropic etching is carried out by using the resist 92 as a mask to achieve separation of the head chips.

The nozzle end surfaces 16A of the conjugated body 73 is formed by etching in this process, and therefore, there is no possibility of cracking of the nozzles 22 as similar to the fourth embodiment.

While the separation of the conjugated body 73 is achieved herein by anisotropic etching, the separation to the head chip units can also be carried out in such a manner that the conjugated body is etched from the upper surface 58A to the partway of the silicon wafer 50 to form grooves 94 (as shown in FIG. 15A), and thereafter, the grooves 94 are penetrated by dicing 95 from the lower surface 50A (as shown in FIG. 15B) to separate the head chip units.

In alternative, instead of the dicing from the lower surface 50A, it is possible that the head chip units are separated by dicing 97 from the upper surface 58A by using a cutting blade having a thickness smaller than the grooves 94 as shown in FIG. 16.

Figure 14B:
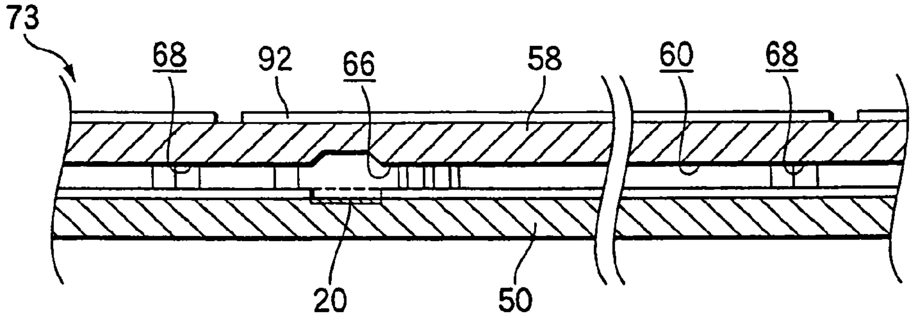
Figure 14C:
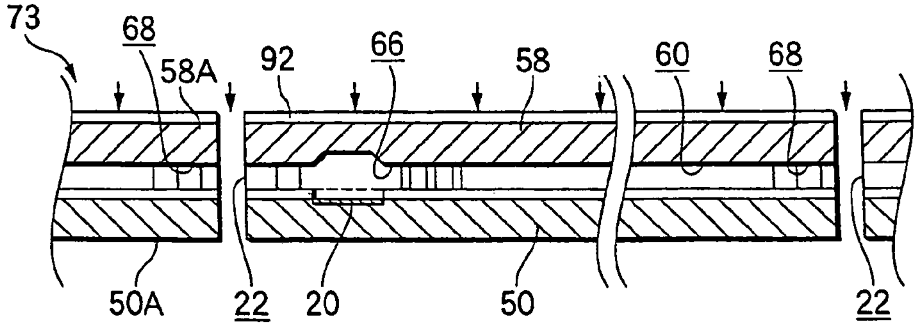

In this embodiment, while the resist pattern 92 is formed on the upper surface 58A of the thinned conjugated body in the process step shown in FIG. 14B, the step of forming the resist pattern can be omitted by employing such a processing method that can attain process addressing, such as laser processing, instead of the anisotropic etching.

The silicon wafer 58 in this embodiment is processed to form the flow path grooves by one step of ODE and one step of RIE, but it is not limited thereto.

Bubble Retention Defect and Function of Miniaturization of the Invention

The functions of the embodiments of the invention will be described by comparing a comparative example (conventional example) from the standpoint of the defect due to bubbles in the common liquid chamber and the miniaturization (cost reduction) of the head chip.

Figure 17A:
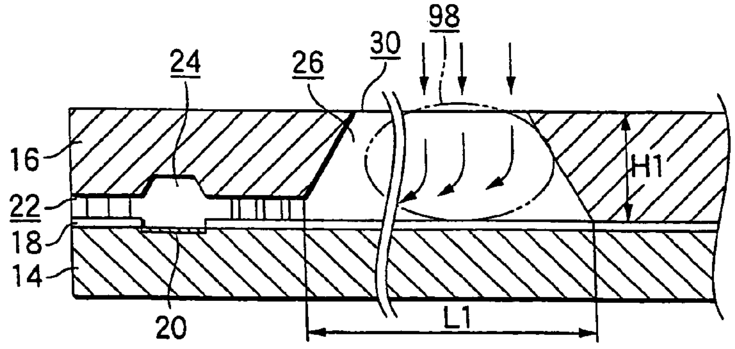
FIG. 17A is a vertical cross sectional view showing a head chip according to a comparative example.

A head chip according to the comparative example (conventional example) is shown in FIG. 17A. The symbol L1 herein means the length of the common liquid chamber 26, and H1 corresponds to the depth of the common liquid chamber 26. For example, H1 is 625 μm, owing to the thickness of the silicon wafer, and L1 is 2,000 μm under consideration of absorbance of the pressure vibration caused by discharge of ink droplets.

Figure 17B:
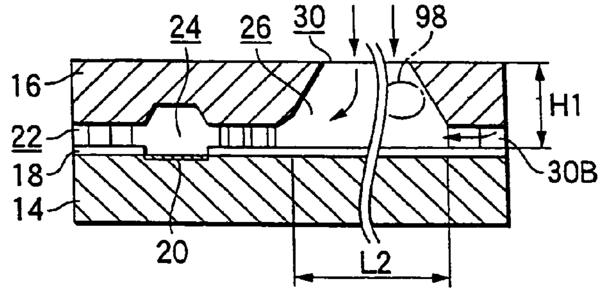
FIG. 17B is a vertical cross sectional view showing a head chip according to the invention.

On the other hand, a head chip 12 according to the second embodiment having ink supplying inlets 30B formed on the back end is shown in FIG. 17B. Since the pressure vibration caused by discharge of ink droplets can be absorbed by the ink supplying inlets 30B, the length L2 and the depth H1 of the common liquid chamber 26 can be reduced to a large extent, and the size of the head chip can be miniaturized. As a result, the capacity ratio of the common liquid chamber 26 with respect to the respective flow paths 24 is decreased to reduce dead water regions in the common liquid chamber 26 owing to the increased ink flow rate, whereby bubbles are difficult to be formed in the common liquid chamber 26, and even when bubbles 98 are formed, recovery therefrom is easy owing to the small capacity of the common liquid chamber 26, and consumption of the ink associated with recovery can be suppressed.

Figure 17C:
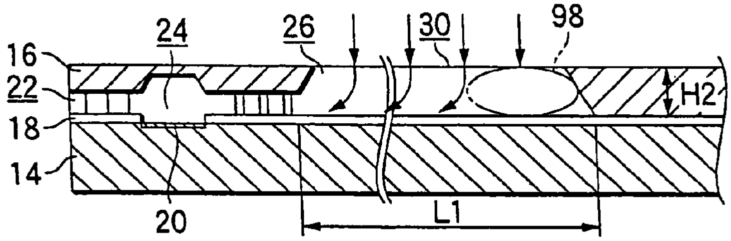
FIG. 17C is a vertical cross sectional view showing a head chip according to the invention.

A head chip having a small depth H1 of the common liquid chamber 26 by decreasing the thickness of the flow path substrate 16 using grinding or etching in comparison to the comparative example is shown in FIG. 17C. In the case shown herein, the length L1 of the common liquid chamber 26 is equivalent to that of the conventional cases. In the case of this head chip, dead water regions are reduced by decreasing the depth H1 of the common liquid chamber 26, and even when bubbles 98 grow, they have small sizes and thus do not go far enough to hinder supply of an ink to the respective flow paths 24. The similar results can be obtained by taking a sufficiently large length for the common liquid chamber 26 in comparison to the comparative example with the constant depth, but in such a case, the size of the head chip becomes large to increase the production cost of the head.

Figure 17D:
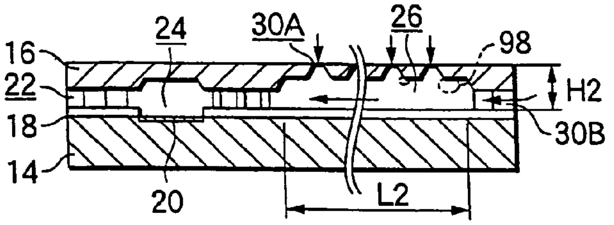
FIG. 17D is a vertical cross sectional view showing a head chip according to the first embodiment of the invention.

A head chip 12 according to the first example is shown in FIG. 17D. The head chip 12 has a depth H1 and a length L1 of the common liquid chamber, which are smaller than those of the comparative example, and the ink supplying inlets 30A have the filter function. In this case, the head chip can be miniaturized owing to the function of relaxing pressure upon discharging an ink attained by the ink supplying inlets 30A, and the filter function of the ink supplying inlets 30A and 30B exerts large effects on prevention of contamination with foreign matters upon production (for example, grinding substrates). It seems that a large number of nuclei for attaching bubbles are present at the filter part, but in practice, attachment of bubbles are substantially not caused because of the high ink flow rate in the vicinity of the filter.

Figure 17E:
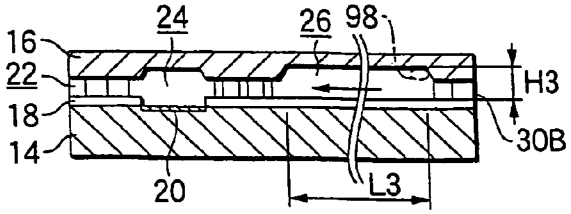
FIG. 17E is a vertical cross sectional view showing a head chip according to the fifth embodiment of the invention.

A head chip 12 having ink supplying inlets 30B opened only on the back surface according to the fifth embodiment is shown in FIG. 17E. The head chip 12 does not require a capacity for providing ink supplying inlets on the upper surface, and thus the head chip can be further miniaturized. Accordingly, because the depth H3 of the common liquid chamber is determined only by the depth of the etched grooves formed on the flow path substrate 16, a step of decreasing the thickness of the flow path substrate by grinding or etching is not particularly necessary when the formation of nozzles is carried out by dicing as similar to the conventional cases. In the design shown herein, when the length L3 is increased, on the other hand, there is a possibility that the flow path resistance upon supplying an ink to the respective flow paths is increased to cause printing failure.

The dimensions of the common liquid chambers of the head chips have the following relationships.

$$L1>L2>L3$$

$$H1>H2\geqq H3$$

Sixth Embodiment

An example of a combination of the ink jet recording heads according to the foregoing embodiments and an ink tank will be described as a sixth embodiment of the invention. The same constitutional elements as in the first to fifth embodiments are attached with the same reference symbols, and detailed descriptions thereof are omitted.

Figure 18:
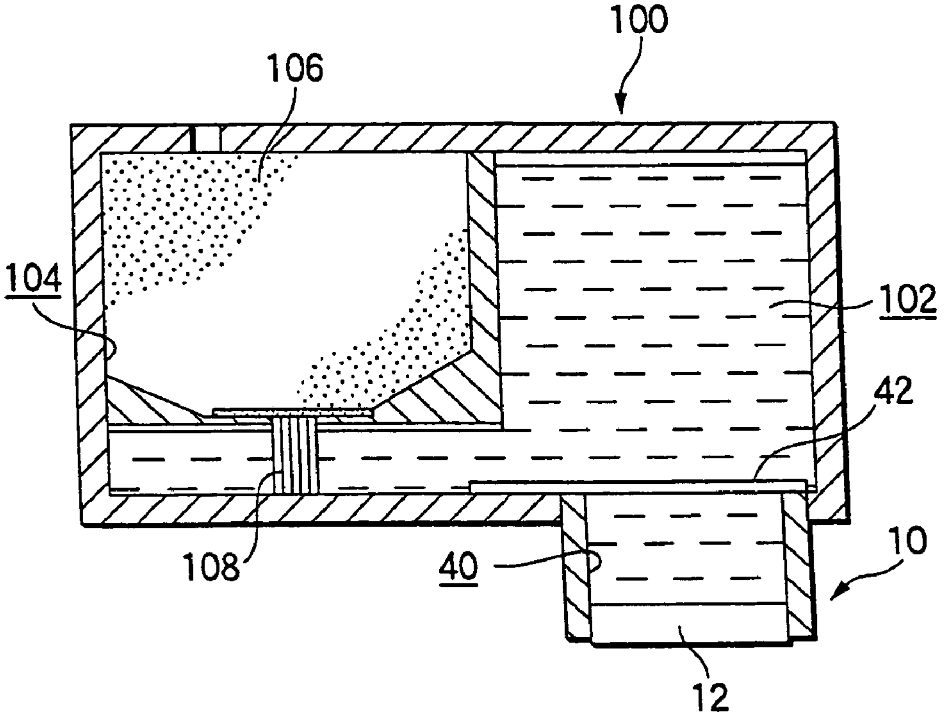
FIG. 18 is a vertical cross sectional view showing an ink tank having an inkjet recording head attached thereto according to a sixth embodiment of the invention.

As shown in FIG. 18, an ink tank 100 has a first ink chamber 102 retaining an ink with a free surface, and a second ink chamber 104 supplying the ink to the first ink chamber 102 with controlling the negative pressure of the first ink chamber 102. The second ink chamber 104 has a porous member 106 arranged therein, which is impregnated with the ink and opened to the atmospheric air, and is connected to the first ink chamber 102 through a meniscus forming member 108.

A lower part of the first ink chamber 102 is connected to the subsidiary ink chamber 40 of the ink jet recording head 10 through a filter 42.

In the ink supplying systems disclosed in JP-A-2001-138541 and JP-A-2001-169090, gaseous matters in the first ink chamber 102 can be evacuated to the outside, and thus growth of bubbles in the ink tank can be more certainly prevented by the foregoing constitution, whereby such printing can be attained that is semipermanently free of bubble defects.

The ink jet recording head 10 is not limited to the embodiment, and the invention can be applied to ink jet recording heads according to the other embodiments and those of the conventional examples.

Seventh Embodiment

A seventh embodiment of the invention will be described with reference to FIG. 19. The same constitutional elements as in the first to sixth embodiments are attached with the same reference symbols, and detailed descriptions thereof are omitted.

Figure 19:
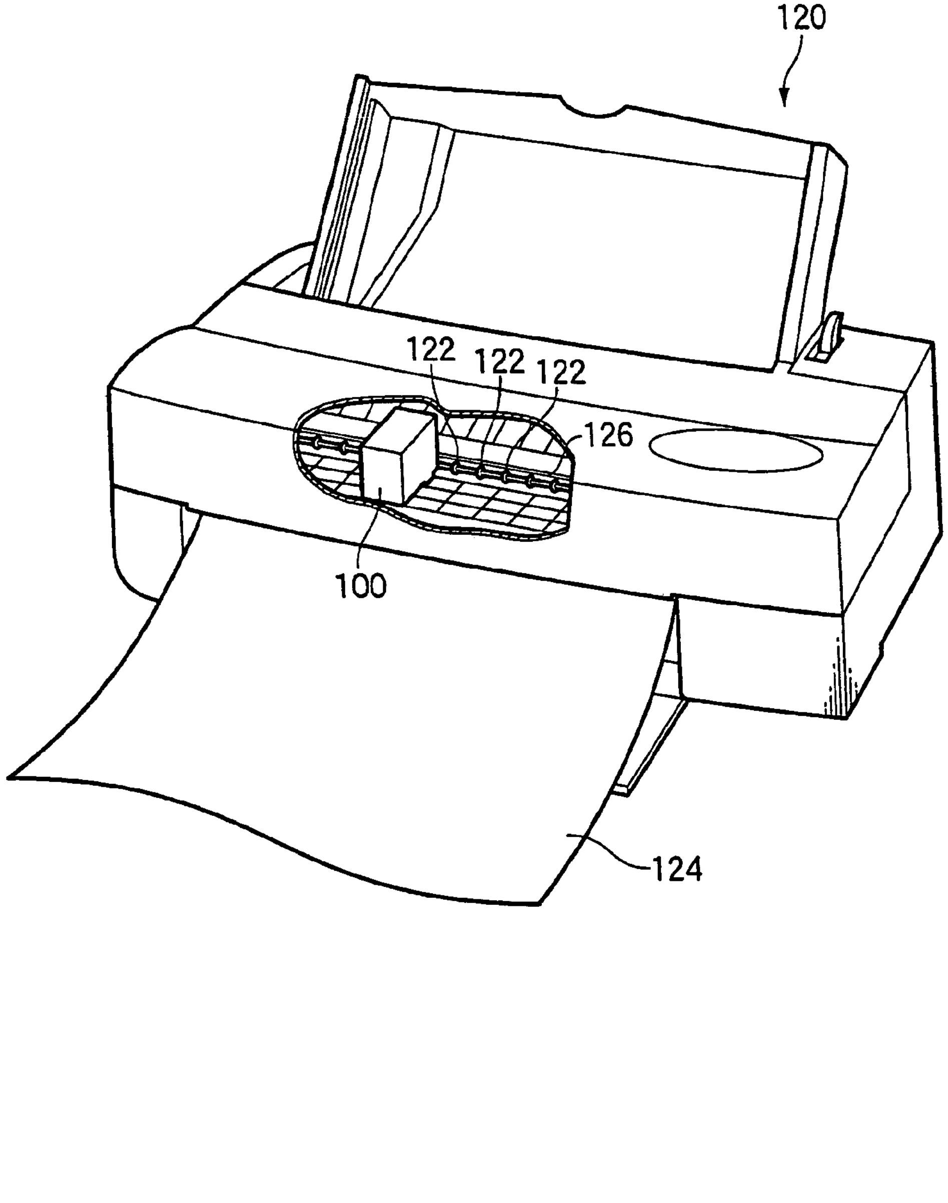
FIG. 19 is a perspective view showing an inkjet recording apparatus according to a seventh embodiment of the invention.

FIG. 19 is a schematic perspective view showing a constitution of an example of an ink jet recording apparatus having the ink jet recording heads according to the embodiments installed therein.

The ink jet recording apparatus 120 has such a structure that paper 124 is conveyed in the secondary scanning direction with a conveying roller 122, whereas an ink tank 100 runs in the primary scanning direction, which is perpendicular to the secondary scanning direction, along a guide shaft 126.

Because the apparatus has the ink tank 100 (ink jet recording bead 10) according to the embodiments, the discharge direction of the ink is stabilized, and the ink is stably supplied without occurrence of bubble retention defects, whereby image formation with high accuracy can be carried out on the paper 124.

Formation Method of Deep Groove

Finally, additional description will be made for the method for forming the deep grooves 84 (as in the fourth embodiment) for cutting on the conjugated body (silicon wafer 58) to cut the conjugated body into the respective head chips.

Figure 20A:
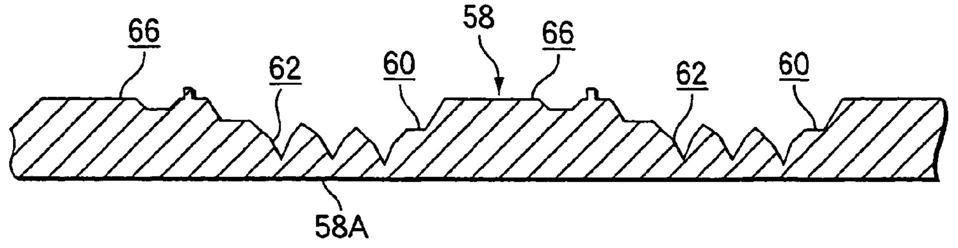
FIGS. 20A to 20D are diagrams showing process steps for producing deep grooves and grooves to be ink supplying inlets on a silicon wafer according to one embodiment of the invention.

In the silicon wafer 58, the grooves for flow paths are formed on the flow path substrate 16 shown in the fourth embodiment by using the production technique disclosed in JP-A-11-227208. At this time, parts to be the ink supplying inlets 30A later are formed by etching by using a pattern having a narrow opening width. As a result, the silicon wafer 58 at the corresponding parts is not penetrated but forms triangular grooves 62 (as shown in FIG. 20A).

Figure 20B:
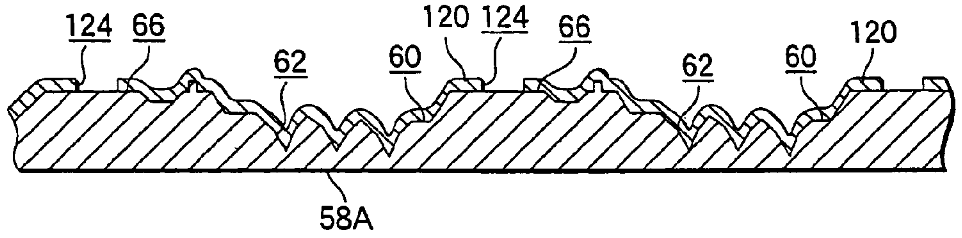

Subsequently, a resist 120 to be a mask on RIE is coated on the silicon wafer 58 and patterned by a photolithography method (as shown in FIG. 20B). Openings 124 for cutting are formed in the resist 120 through the patterning. Because the deep grooves (grooves 60, 62 and the like) are formed upon coating the resist, the resist 120 cannot be coated on the silicon wafer in good conditions by the ordinary spin coating method. Consequently, the resist 120 is coated by a spray coating method, which can be carried out coating operations in good conditions even on a surface having large steps. Furthermore, the thickness of the resist 120 is made sufficiently large (35 μm) to prevent problems (such as disappearance of the mask resist) caused with a large etching depth.

Figure 20C:
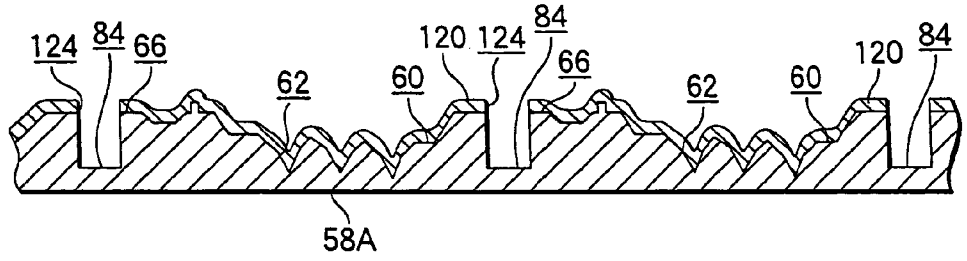

The silicon wafer is then etched by about 100 μm by using the resist 120 as a mask to form deep grooves 84 for cutting (as shown in FIG. 20C). The etching is carried out by ICP, which provides a high etching rate. The gas used is a mixed gas of $SF_6$ and $C_4F_8$. The temperature is 15° C., the coil output is 500 W, and the platen output is 9 W.

Figure 20D:
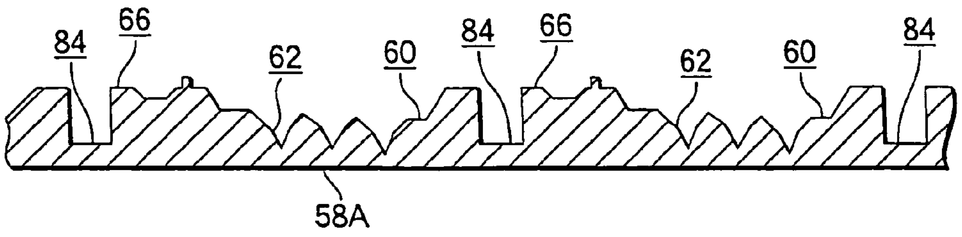

Subsequently, the resist 120 is removed by an oxygen plasma to complete the process (as shown in FIG. 20D). The appearance shown in FIG. 11 is thus obtained in this stage. The nozzle end surfaces 16A are surfaces processed by RIE. In this example, a head chip 12 is then completed through the process steps shown in FIGS. 10A to 10E. The ink supplying inlets 30A are formed by penetrating the triangular grooves 62 through grinding or etching the silicon substrate 58 from the back surface 58A.

Another example will be described.

In this example, grooves are formed on the silicon wafer 58 without previously forming grooves for the ink supplying inlets 30A in the groove 60 to be the common liquid chamber.

Figure 21A:
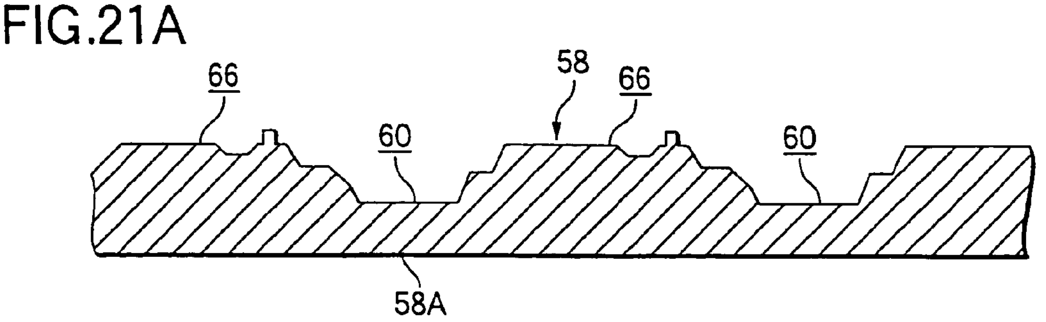
FIGS. 21A to 21D are diagrams showing process steps for producing deep grooves on a silicon wafer according to one embodiment of the invention.
Figure 21B:
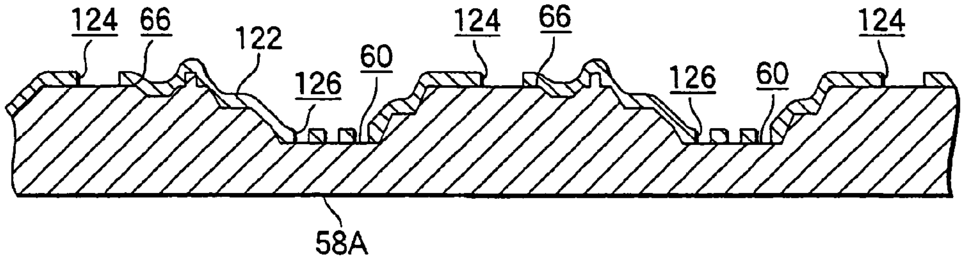

A resist 122 is coated on the silicon wafer 58 and patterned by a photolithography method in the similar manner as in the foregoing embodiments (as shown in FIG. 21B). Openings 124 for cutting and openings 126 for the ink supplying inlets 30A are formed in the resist 122 through the patterning.

Figure 21C:
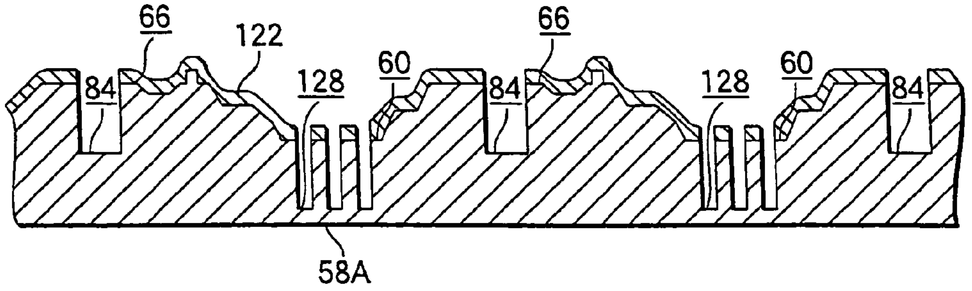
Figure 21D:
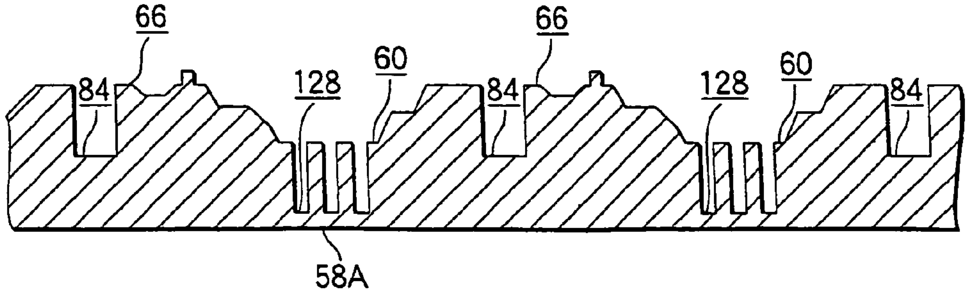

The silicon wafer 58 is etched by about 100 μm by using the resist 122 as a mask to form deep grooves 84 and grooves 128 for the ink supplying inlets 30A (as shown in FIG. 21C), and then the resist 122 is removed by an oxygen plasma to complete the process (as shown in FIG. 21D).

In the production process, the grooves 128 to be the ink supplying inlets 30A have been formed upon forming the nozzle end surfaces 16A (deep grooves 84) by RIE processing. Therefore, the horizontal cross sectional shapes of the grooves 128 are constant in the depth direction. In other words, such an advantage can be obtained that in the case where the grooves 128 are penetrated by etching or grinding from the back surface 58A of the silicon wafer 58, the diameters of the ink supplying inlets 30A are not fluctuated depending on the depth of etching or grinding.

In this example, the processing of the deep grooves 84 (nozzle end surfaces 16A) and the formation of the grooves 128 are simultaneously carried out, but the process steps shown in FIGS. 21B to 21D may be carried out twice depending on the demanded depths thereof.

Figure 22A:
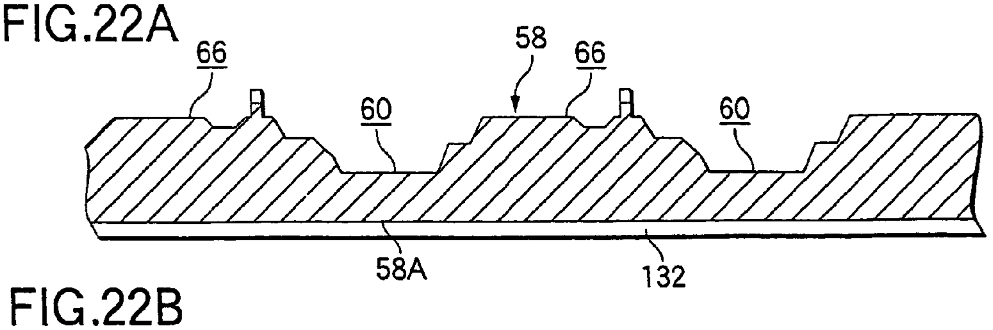
FIGS. 22A to 22E are diagrams showing process steps for producing deep grooves and grooves to be ink supplying inlets on a silicon wafer according to one embodiment of the invention.
Figure 22B:
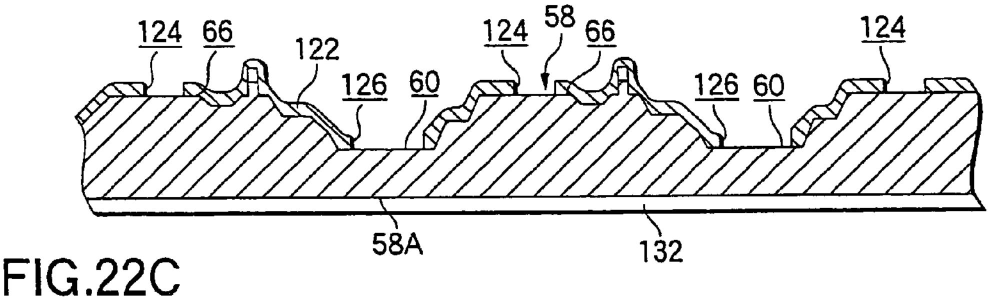
Figure 22C:
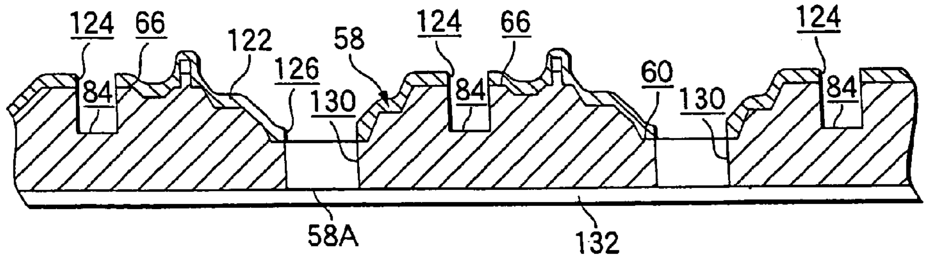
Figure 22D:
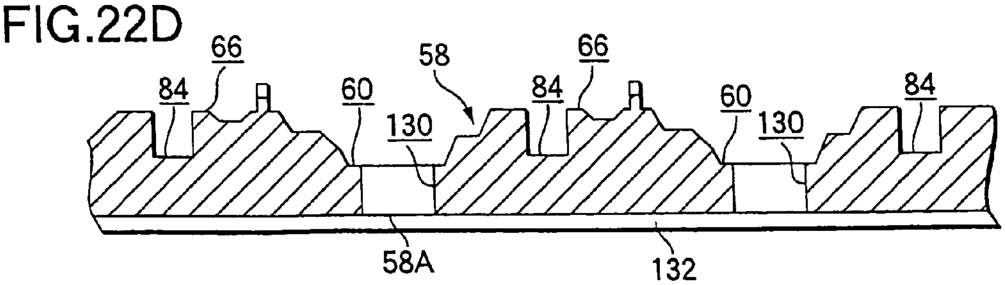
Figure 22E:
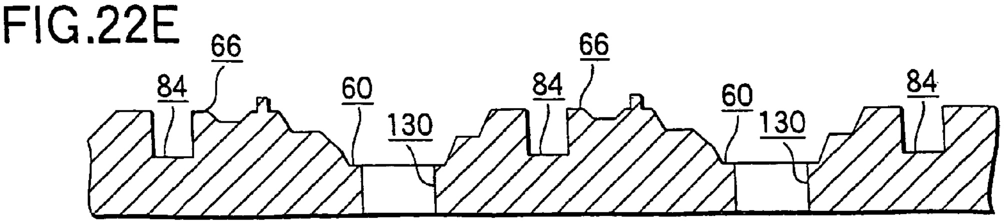
Figure 23:
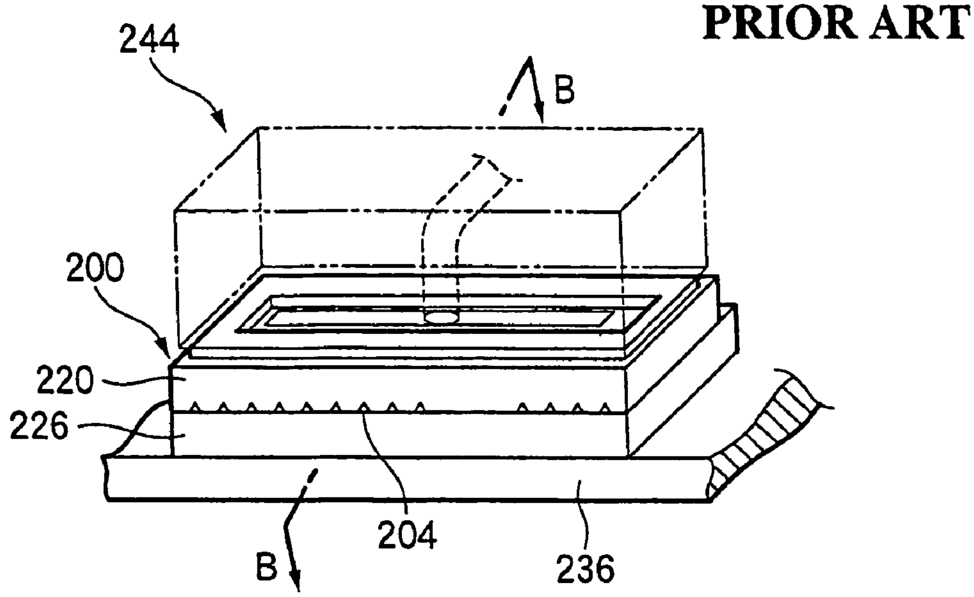
FIG.23 PRIOR ART
FIG. 23 is a perspective view showing an ink jet recording head according to the conventional example.
Figure 24:
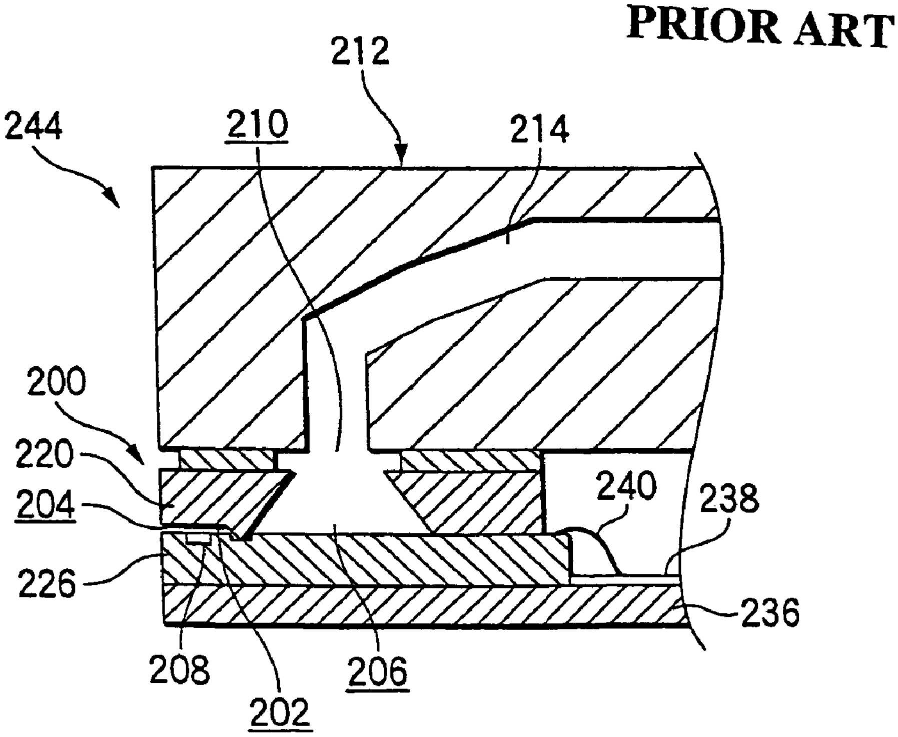
FIG.24 PRIOR ART
FIG. 24 is a vertical cross sectional view showing an ink jet recording head according to the conventional example.
Figures 25A, 25B, 25C, 25D, 25E, 25F:
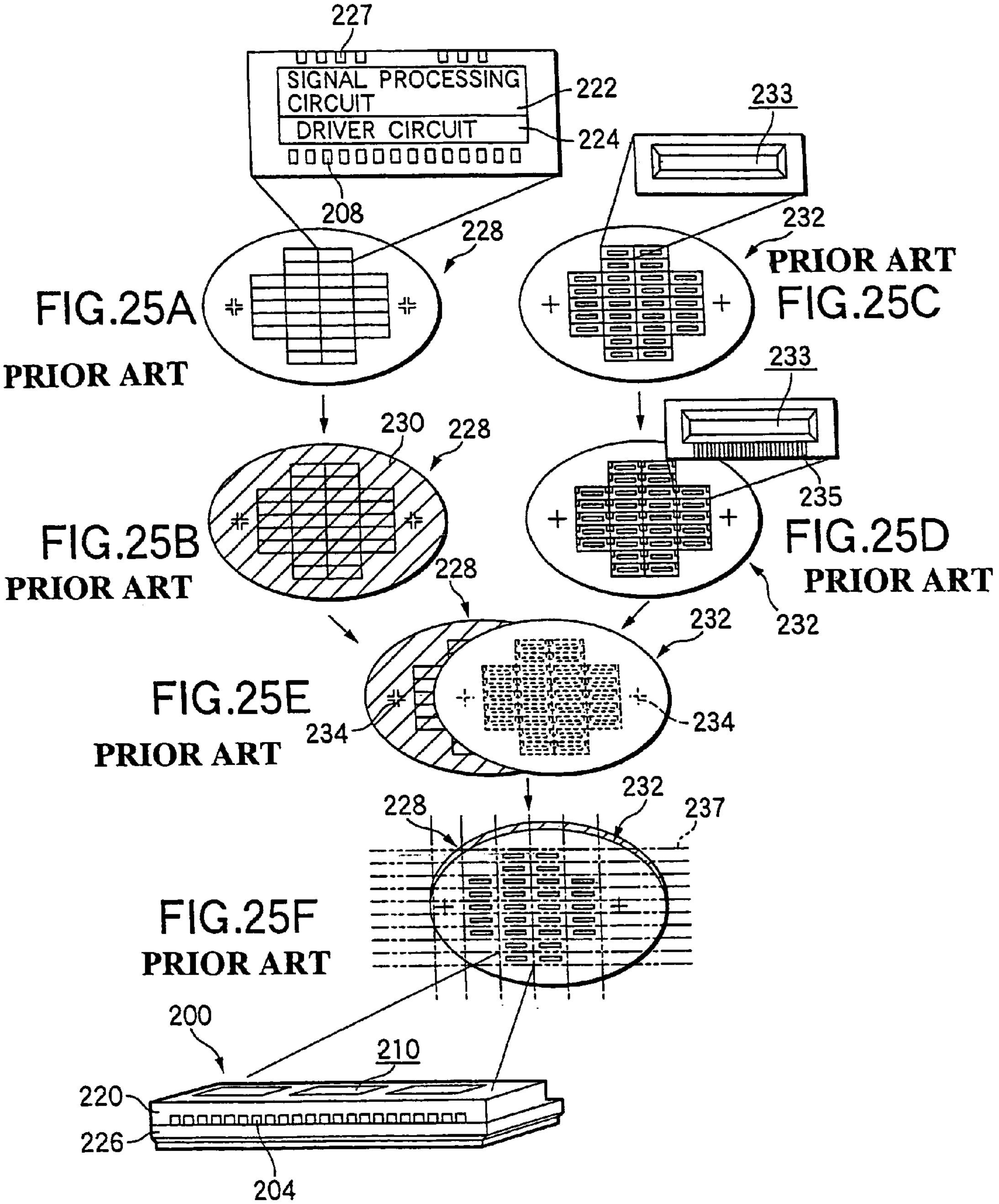
FIG.25A PRIOR ART
FIG.25C PRIOR ART
FIG.25B PRIOR ART
FIG.25D PRIOR ART
FIG.25E PRIOR ART
FIG.25F PRIOR ART
FIGS. 25A to 25F are diagrams showing process steps for producing an ink jet recording head according to the conventional example.
Figure 26A:
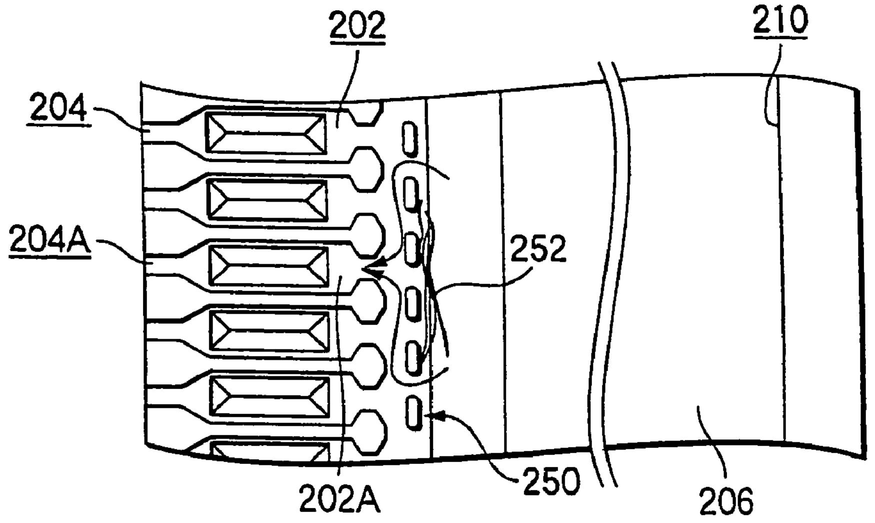
FIG.26A PRIOR ART
FIG. 26A is a plane view showing a flow path substrate constituting an ink jet recording head according to the conventional example.
Figure 26B:
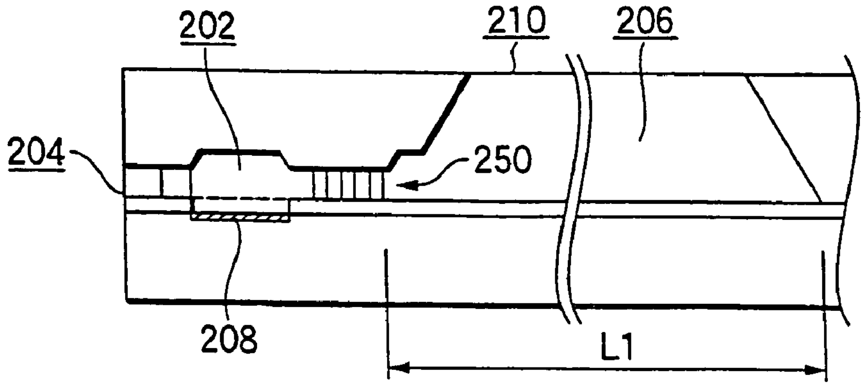
FIG.26B PRIOR ART
FIG. 26B is a vertical cross sectional view showing the ink jet recording head.

The production process of this example can be applied not only to the case where ink supplying inlets 30A having a filter function, but also to the case where ordinary ink supplying inlets 30A (having a rectangular shape laid along the arranging direction of the nozzles) are formed (as shown in FIGS. 22A to 22E). In this case, a protective film 132 is preferably formed on the back surface of the silicon wafer 58 upon penetrating the grooves 130 in the silicon wafer 58 by RIE (as shown in FIG. 22C) from the standpoint of protection of an electrode of an etching apparatus and stability of the plasma. The protective film 132 is preferably an $SiO_2$ film since it can be easily formed on the silicon wafer 58.

Another method for forming vertical grooves having different depths in the silicon wafer 58 is disclosed in Japanese Patent Application No. 2000-254533. The nozzle end surfaces 16A can be formed by RIE using the method. The method is better than the foregoing method of spray-coating a thick resist film in the positional accuracy of the tip ends of the nozzles, but has such a defect that the grooves are difficult to be deep. The selection of these methods can be made depending on the demanded specification.

According to the invention, an ink jet recording head can be miniaturized, and the bubble retention defect is suppressed. According to the production process of the invention, such a head chip can be produced that is prevented from cracking of nozzles to attain high ink discharging performance.

The entire disclosure of Japanese Patent Application No. 2001-107283 filed on Apr. 5, 2001 including specification, claims, drawings and abstract is incorporated herein by reference in its entirety.

What is claimed is:

1. A process for producing an ink jet recording head, comprising the steps of:

conjugating a first silicon wafer having grooves for flow paths on a flow path forming surface thereof and a second silicon wafer having ink ejecting elements on an ejecting element forming surface thereof with the ejecting element forming surface and the flow path forming surface facing each other to form a conjugated body;

thinning a thickness of the conjugated body from at least one surface of the conjugated body; and cutting the conjugated body by a non-contact cutting method to obtain plural head chips and to open ink discharging outlets on a cut surface.

2. The process for producing an ink jet recording head according to claim 1, wherein the non-contact cutting method has vertical anisotropy.

3. The process for producing an ink jet recording head according to claim 1, wherein the non-contact cutting method is etching, penetration is carried out from one side to the other side of the conjugated body, and a protective film is provided on the other side.

4. The process for producing an ink jet recording head as claimed in claim 3, wherein the protective film is an $SiO_2$ film.

5. A process for producing an ink jet recording head, comprising the steps of:

forming, on a first silicon wafer having grooves for flow paths on a flow path forming surface thereof, deep grooves having a depth larger than that of the flow path grooves by a non-contact cutting method;

conjugating a second silicon wafer having ink ejecting elements on an ejecting element forming surface thereof, and the first silicon wafer with the ejecting element forming surface and the flow path forming surface being faced each other to form a conjugated body;

thinning the first silicon wafer from a back surface of the flow path forming surface to penetrate only the deep grooves to the back surface; and cutting the conjugated body thus penetrated into respective head chips.

6. The process for producing an ink jet recording head as claimed in claim 5, wherein after penetrating the deep grooves, deep grooves are formed on the ejecting element forming surface of the second silicon wafer through the deep grooves thus penetrated by a non-contact cutting method.

7. The process for producing an ink jet recording head as claimed in claim 6, wherein after forming the deep grooves on the ejecting element forming surface, the deep grooves are penetrated to the back surface of the second silicon wafer to cut the conjugated body into respective head chips.

8. The process for producing an ink jet recording head as claimed in claim 7, wherein the deep grooves on the second silicon wafer are penetrated by thinning the second silicon wafer from the back surface thereof.

9. The process for producing an ink jet recording head as claimed in claim 5, wherein the deep grooves formed on the first silicon wafer have a depth that is larger than those of all the other flow path grooves.

10. The process for producing an ink jet recording head as claimed in claim 5, wherein ink supplying inlets are opened simultaneously with penetration of the deep grooves formed on the first silicon wafer.

11. The process for producing an ink jet recording head as claimed in claim 5, wherein the non-contact cutting method is etching, a resist pattern is formed to have openings only on a region where the deep grooves are to be formed on the flow path forming surface of the first silicon wafer having the flow path grooves, and the deep grooves are formed by etching by using the resist as a mask.

12. The process for producing an ink jet recording head as claimed in claim 11, wherein a spray coating method is used for coating the resist on the flow path forming surface.

13. The process for producing an ink jet recording head as claimed in claim 5, wherein the step of thinning the silicon wafer from the back surface is carried out in such a state that a resin material is filled in at least a part of the flow path grooves on the first silicon wafer, and the resin material is removed after the step.

* * * * *